United States Patent
Wan

(10) Patent No.: US 11,196,306 B2
(45) Date of Patent: Dec. 7, 2021

(54) DEVICE TO BE CHARGED, WIRELESS CHARGING DEVICE AND CONTROL METHOD THEREOF

(71) Applicant: Guangdong Oppo Mobile Telecommunications Corp., Ltd., Guangdong (CN)

(72) Inventor: Shiming Wan, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 162 days.

(21) Appl. No.: 16/589,074

(22) Filed: Sep. 30, 2019

(65) Prior Publication Data
US 2020/0036216 A1    Jan. 30, 2020

Related U.S. Application Data

(63) Continuation of application No. PCT/CN2018/081963, filed on Apr. 4, 2018.

(30) Foreign Application Priority Data

Apr. 7, 2017    (WO) ................ PCT/CN2017/079784

(51) Int. Cl.
*H01M 10/44* (2006.01)
*H01M 10/46* (2006.01)
(Continued)

(52) U.S. Cl.
CPC .............. *H02J 50/80* (2016.02); *H02J 5/005* (2013.01); *H02J 7/00* (2013.01); *H02J 7/0026* (2013.01);
(Continued)

(58) Field of Classification Search
CPC .......... H02J 50/10; H02J 50/12; H02J 7/0045; H02J 7/0044; H02J 7/00045;
(Continued)

(56) References Cited

U.S. PATENT DOCUMENTS

2012/0223590 A1    9/2012    Low et al.
2012/0300413 A1    11/2012   Iida
(Continued)

FOREIGN PATENT DOCUMENTS

CN    102013717 A    4/2011
CN    102130367 A    7/2011
(Continued)

OTHER PUBLICATIONS

Extended European Search Report for European Application No. 18780574.2 dated Feb. 27, 2020.
(Continued)

*Primary Examiner* — Edward Tso
(74) *Attorney, Agent, or Firm* — Young Basile Hanlon & MacFarlane, P.C.

(57) ABSTRACT

The present disclosure provides a device to be charged, a wireless charging device and a control method thereof. The device to be charged includes: a wireless receiving circuit, configured to receive an electromagnetic signal transmitted by a wireless charging device and convert the electromagnetic signal to a first output voltage; a step-down circuit, configured to perform step-down process on the first output voltage to obtain a second output voltage, and charge a battery of the device to be charged based on the second output voltage; a temperature detecting circuit, configured to detect a temperature of the device to be charged; a communication control circuit, configured to send feedback information to the wireless charging device, when the temperature is larger than a preset threshold. The feedback
(Continued)

information is configured to trigger the wireless charging device to control wireless charging process to reduce the first output voltage.

17 Claims, 8 Drawing Sheets

(51) Int. Cl.
*H02J 50/80* (2016.01)
*H02J 50/10* (2016.01)
*H02J 7/00* (2006.01)
*H02M 3/07* (2006.01)
*H04B 5/00* (2006.01)
*H02J 5/00* (2016.01)
*H02J 50/12* (2016.01)
*H02J 7/02* (2016.01)
*H02J 7/04* (2006.01)

(52) U.S. Cl.
CPC ........ *H02J 7/0029* (2013.01); *H02J 7/00034* (2020.01); *H02J 7/0044* (2013.01); *H02J 7/00714* (2020.01); *H02J 7/025* (2013.01); *H02J 7/045* (2013.01); *H02J 50/10* (2016.02); *H02J 50/12* (2016.02); *H02M 3/07* (2013.01); *H04B 5/0037* (2013.01); *H04B 5/0075* (2013.01); *H02J 2207/20* (2020.01); *Y02B 40/00* (2013.01)

(58) Field of Classification Search
CPC .............. H02J 7/00309; H02J 7/00041; H04B 5/0075; H04B 5/0037
USPC .......................... 320/107, 108, 140, 150, 162
See application file for complete search history.

(56) References Cited

U.S. PATENT DOCUMENTS

| | | |
|---|---|---|
| 2013/0002026 A1 | 1/2013 | Mizutani et al. |
| 2013/0002202 A1 | 1/2013 | Kuraishi |
| 2014/0159654 A1 | 6/2014 | Lee et al. |
| 2014/0247052 A1 | 9/2014 | Hada |
| 2014/0329472 A1 | 11/2014 | Kovacs et al. |
| 2016/0036497 A1 | 2/2016 | Tavakoli Shiraji et al. |

FOREIGN PATENT DOCUMENTS

| | | |
|---|---|---|
| CN | 102522799 A | 6/2012 |
| CN | 103036282 A | 4/2013 |
| CN | 202998182 U | 6/2013 |
| CN | 103944243 A | 7/2014 |
| CN | 104113104 A | 10/2014 |
| CN | 104124483 A | 10/2014 |
| CN | 104283293 A | 1/2015 |
| CN | 104467130 A | 3/2015 |
| CN | 104600869 A | 5/2015 |
| CN | 104617632 A | 5/2015 |
| CN | 104752046 A | 7/2015 |
| CN | 105148402 A | 12/2015 |
| CN | 105226779 A | 1/2016 |
| CN | 105337384 A | 2/2016 |
| CN | 205355893 U | 6/2016 |
| CN | 105826066 A | 8/2016 |
| CN | 105896670 A | 8/2016 |
| CN | 205544421 U | 8/2016 |
| CN | 105978049 A | 9/2016 |
| CN | 106026231 A | 10/2016 |
| CN | 106026237 A | 10/2016 |
| CN | 106063073 A | 10/2016 |
| CN | 106169798 A | 11/2016 |
| CN | 106451705 A | 2/2017 |
| EP | 2328223 A1 | 6/2011 |
| EP | 2590300 A1 | 5/2013 |
| JP | 2013085386 A | 5/2013 |
| JP | 2014138478 A | 7/2014 |
| JP | 2014168365 A | 9/2014 |
| JP | 2016092986 A | 5/2016 |
| JP | 2016214026 A | 12/2016 |
| KR | 20130023618 A | 3/2013 |
| KR | 20150099854 A | 9/2015 |
| TW | 201145753 A | 12/2011 |
| TW | I482391 B | 4/2015 |
| TW | 201533561 A | 9/2015 |
| TW | I552483 B | 10/2016 |

OTHER PUBLICATIONS

OA for EP application 18780574.2 dated Nov. 20, 2020.
OA and English translation for JP application 2019-553928 dated Nov. 27, 2020.
OA and English translation for KR application 10-2019-7030861 dated Oct. 20, 2020.
ISR with English translation for PCT application PCT/CN2018/081963.
ISR with English translation for PCT application PCT/CN2018/081962.
ISR with English translation for PCT application PCT/CN2017/085990.
ISR with English translation for PCT application PCT/CN2017/079784.
OA with English translation for TW application 107112166.
OA with English translation for TW application 107112719.
ISR with English translation for PCT application PCT/CN2018/082013.
ISR with English translation for PCT application PCT/CN2017/080334.
ISR with English translation for PCT application PCT/CN2018/076722.
ISR with English translation for PCT application PCT/CN2018/081925.
ISR with English translation for PCT application PCT/CN2018/081909.
Communication pursuant to Article 94(3) EPC for EP Application 18780574.2 dated Apr. 30, 2021. (6 pages).
Communication pursuant to Article 94(3) EPC for EP Application 18780574.2 dated Aug. 11, 2021. (8 pages).

DEVICE TO BE CHARGED, WIRELESS CHARGING DEVICE AND CONTROL METHOD THEREOF

CROSS-REFERENCE TO RELATED APPLICATION(S)

This application is a continuation of International Application No. PCT/CN2018/081963, filed on Apr. 4, 2018, which claims priority to International Application No. PCT/CN2017/079784, filed on Apr. 7, 2017, the entire contents of both of which are incorporated herein by reference in their entireties.

TECHNICAL FIELD

The present disclosure relates to a wireless charging field, and more particularly, to a device to be charged, a wireless charging device and a control method thereof.

BACKGROUND

At present, in the charging technology field, a device to be charged is typically charged in a wired charging mode.

Taking a mobile phone as an example, the mobile phone is typically charged in a wired charging mode. In detail, when there is a need to charge the mobile phone, the mobile phone may be coupled with a power supply device via a charging cable (for example, a USB (universal serial bus) cable), and an output power of the power supply device may be transmitted to the mobile phone via the charging cable, to charge a battery in the mobile phone.

For the device to be charged, it needs to use the charging cable in the wired charging mode, which results in cumbersome operation in a charging preparation stage. Thus, a wireless charging mode has been favored more and more by people. However, the conventional wireless charging mode has a bad effect, and needs improvement.

SUMMARY

In a first aspect, a device to be charged is provided. The device to be charged includes: a wireless receiving circuit, configured to receive an electromagnetic signal transmitted by a wireless charging device and convert the electromagnetic signal to an output voltage of the wireless receiving circuit; a step-down circuit, configured to receive the output voltage of the wireless receiving circuit, perform step-down process on the output voltage of the wireless receiving circuit to obtain an output voltage of the step-down circuit, and charge a battery of the device to be charged based on the output voltage of the step-down circuit; a temperature detecting circuit, configured to detect a temperature of the device to be charged; and a communication control circuit, configured to send feedback information to the wireless charging device, when the temperature of the device to be charged is larger than a preset threshold, wherein the feedback information is configured to trigger the wireless charging device to control wireless charging process to reduce the output voltage of the wireless receiving circuit.

In a second aspect, a wireless charging device is provided. The wireless charging device includes: a wireless transmitting circuit, configured to transmit an electromagnetic signal to perform wireless charging on a device to be charged; and a communication control circuit, configured to: receive feedback information sent by the device to be charged when a temperature of the device to be charged is greater than a preset threshold; and control the wireless charging according to the feedback information to reduce an output voltage of a wireless receiving circuit of the device to be charged.

In a third aspect, a charging control method is provided. The method is applied to a wireless charging device, and includes: transmitting an electromagnetic signal to perform wireless charging on a device to be charged; receiving feedback information sent by the device to be charged when a temperature of the device to be charged is greater than a preset threshold; and controlling the wireless charging according to the feedback information to reduce an output voltage of a wireless receiving circuit of the device to be charged.

DETAILED DESCRIPTION

In embodiments of the present disclosure, a device to be charged is charged based on a wireless charging technology, which can complete power transmission without a cable, simplifying operations in a charging preparation stage.

In the conventional wireless charging technology, a power supply device (for example, an adapter) is typically coupled with a wireless charging device (for example, a wireless charging base), and an output power of the power supply device is transmitted to the device to be charged in a wireless mode (for example, in a form of electromagnetic signal or electromagnetic wave) via the wireless charging device, to perform wireless charging on the device to be charged.

According to different wireless charging principles, the wireless charging mode can be implemented by magnetic coupling (or electromagnetic induction), magnetic resonance, and radio waves. At present, the mainstream wireless charging standards include a QI standard, a PMA (power matters alliance) standard, and an A4WP (alliance for wireless power). The QI standard and the PMA standard adopts the magnetic coupling for wireless charging. The A4WP standard adopts the magnetic resonance for wireless charging.

In the following, the conventional wireless charging mode is described with reference to FIG. 1.

Figure 1:
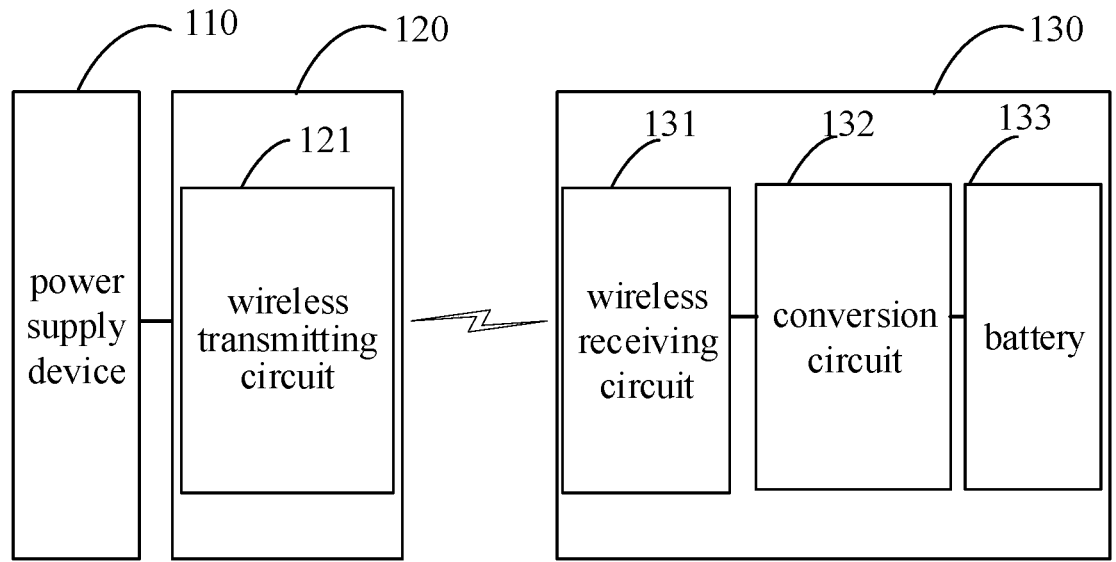
FIG. 1 is a schematic diagram illustrating a conventional wireless charging system.

As illustrated in FIG. 1, the wireless charging system includes a power supply device 110, a wireless charging device 120 and a device to be charged 130. The wireless charging device 120 may be, for example, a wireless charging base. The device to be charged 130 may be, for example, a terminal.

After the power supply device 110 is coupled with the wireless charging device 120, an output current of the power supply device 110 may be transmitted to the wireless charging device 120. The wireless charging device 120 may convert the output current of the power supply device 110 to an electromagnetic signal (or an electromagnetic wave) via an internal wireless transmitting circuit 121 for transmitting. For example, the wireless transmitting circuit 121 may convert the output current of the power supply device to alternating current, and convert the alternating current to the electromagnetic signal via a transmitting coil or transmitting antenna (not shown).

The device to be charged 130 may receive the electromagnetic signal transmitted by the wireless transmitting circuit 121 via the wireless receiving circuit 131, and convert the electromagnetic signal to an output current of the wireless receiving circuit 131. For example, the wireless receiving circuit 131 may convert the electromagnetic signal transmitted by the wireless transmitting circuit 121 to alternating current via a receiving coil or receiving antenna (not shown), and perform operations such as rectification and/or filtering on the alternating current to convert the alternating current to an output voltage and an output current of the wireless receiving circuit 131.

For the conventional wireless charging technology, before the wireless charging, the wireless charging device 120 and the device to be charged 130 may negotiate a transmitting power of the wireless transmitting circuit 121 in advance. Assuming that the power negotiated by the wireless charging device 120 and the device to be charged 130 is 5 W, the output voltage and the output current of the wireless receiving circuit 131 are generally 5V and 1 A. Assuming that the power negotiated by the wireless charging device 120 and the device to be charged 130 is 10.8 W, the output voltage and the output current of the wireless receiving circuit 131 are generally 9V and 1.2 A.

The output voltage of the wireless receiving circuit 131 is not suitable for being directly applied to both ends of the battery 133, and needs to be first converted by the conversion circuit 132 in the device to be charged 130, such that a charging voltage and/or a charging current expected by the battery 133 in the device to be charged 130 are obtained.

The conversion circuit 132 may be configured to convert the output voltage of the wireless receiving circuit 131 (for example, constant voltage and/or constant current control), to meet a requirement of the charging voltage and/or charging current expected by the battery 133.

As an example, the conversion circuit 132 may be a charging management module, such as a charging integrated circuit (IC). During a charging process of the battery 133, the conversion circuit 132 may be configured to manage the charging voltage and/or charging current of the battery 133. The conversion circuit 132 may have at least one of a voltage feedback function and a current feedback function, so as to manage the charging voltage and/or charging current of the battery 133.

For example, the charging process of the battery may include at least one of a trickle charging stage, a constant current charging stage and a constant voltage charging stage.

In the trickle charging stage, the conversion circuit 132 may utilize a current feedback loop to ensure that a current flowing into the battery 133 in the trickle charging stage meets the charging current (such as a first charging current) expected by the battery 133. In the constant current charging stage, the conversion circuit 132 may utilize a current feedback loop to ensure that the current flowing into the battery 133 in the constant current charging stage meets the charging current (such as a second charging current, which may be greater than the first charging current) expected by the battery 133. In the constant voltage charging stage, the conversion circuit 132 may utilize a voltage feedback loop to ensure that a voltage applied to both ends of the battery 133 in the constant voltage charging stage meets the charging voltage expected by the battery 133.

As an example, when the output voltage of the wireless receiving circuit 131 is greater than the charging voltage expected by the battery 133, the conversion circuit 132 may be configured to perform a buck conversion on the output voltage of the wireless receiving circuit 131 to enable a buck-converted charging voltage to meet the requirement of the charging voltage expected by the battery 133. As another example, when the output voltage of the wireless receiving circuit 131 is less than the charging voltage expected by the battery 133, the conversion circuit 132 may be configured to perform a boost conversion on the output voltage of the wireless receiving circuit 132 to enable a boost-converted charging voltage to meet the requirement of the charging voltage expected by the battery 133.

As another example, assume that the wireless receiving circuit 131 outputs a constant voltage of 5V. When the battery 133 includes a single battery cell (such as a lithium battery cell, a charging cut-off voltage of a single battery cell is typically 4.2V), the conversion circuit 132 (for example, a buck circuit) may perform a buck conversion on the output voltage of the wireless receiving circuit 131, such that the charging voltage obtained after the buck conversion meets a requirement of the charging voltage expected by the battery 133.

As yet another example, assume that the wireless receiving circuit 131 outputs a constant voltage of 5V. When the battery 133 includes two or more battery cells (such as lithium battery cell, a charging cut-off voltage of a single battery cell is typically 4.2V) coupled in series, the conversion circuit 132 (for example, a boost circuit) may perform a boost conversion on the output voltage of the wireless receiving circuit 131, such that the charging voltage obtained after the boost conversion meets a requirement of the charging voltage expected by the battery 133.

Limited by a poor conversion efficiency of the conversion circuit 132, a part of electric energy is lost in a form of heat, and the heat may gather inside the device to be charged 130. A design space and a space for heat dissipation of the device to be charged are small (for example, the physical size of a mobile terminal used by a user becomes thinner and thinner, while plenty of electronic elements are densely arranged in the mobile terminal to improve performance of the mobile terminal), which not only increases difficulty in designing the conversion circuit 132, but also results in that it is hard to dissipate the heat gathered in the device to be charged 130 in time, thus further causing an abnormity of the device to be charged 130.

For example, the heat gathered on the conversion circuit 132 may cause a thermal interference on electronic elements neighboring the conversion circuit 132, thus causing abnormal operations of the electronic elements. For another example, the heat gathered on the conversion circuit 132 may shorten the service life of the conversion circuit 132 and neighboring electronic elements. For yet another example, the heat gathered on the conversion circuit 132 may cause a thermal interference on the battery 133, thus causing abnormal charging and/or abnormal discharging of the battery 133. For still another example, the heat gathered on the conversion circuit 132 may increase the temperature of the device to be charged 130, thus affecting user experience during the charging. For still yet another example, the heat gathered on the conversion circuit 132 may short-circuit the conversion circuit 132, such that the output voltage of the wireless receiving circuit 131 is directly applied to both ends of the battery 133, thus causing abnormal charging of the battery 133, which brings safety hazard if the over-voltage charging lasts for a long time, for example, the battery 133 may explode.

In order to solve the above problem, embodiments of the present disclosure provide a wireless charging system. The wireless charging device and the device to be charged in the wireless charging system can perform wireless communication, such that the wireless charging device can control the wireless charging process, to enable the transmitting power of the wireless charging device to match the charging voltage and/or charging current presently required by the battery in the device to be charged (or matches a present charging phase of the battery in the device to be charged). The transmitting power of the wireless charging device matching the charging voltage and/or the charging current presently required by the battery refers to that the transmitting power of the electromagnetic signal is configured by the wireless charging device such that, after the electromagnetic signal is received by the wireless receiving circuit, the output voltage and/or the output current of the wireless receiving circuit match the charging voltage and/or charging current presently required by the battery in the device to be charged (or the output voltage and/or output current of the wireless receiving circuit meet the charging requirement of the battery in the device to be charged). In this way, in the device to be charged, the output voltage and/or the output current of the wireless receiving circuit can be directly applied to both ends of the battery to charge the battery (hereinafter, this charging method of the device to be charged is referred to as direct charging), thus avoiding the above-mentioned problems such as energy loss and heating caused by the conversion circuit converting the output voltage and/or the output current of the wireless receiving circuit.

After solving the heating problem of the conversion circuit, the main heat sources in the wireless charging process are concentrated in the wireless transmitting circuit (including the transmitting coil) and the wireless receiving circuit (including the receiving coil).

Assuming that the charging power is 20 W, and the charging voltage/charging current of a single cell is 5V/4 A. As a possible implementation, the wireless transmitting circuit can generate an electromagnetic signal based on 5V/4 A, and accordingly, the wireless receiving circuit converts the electromagnetic signal into an output voltage/output current of 5V/4 A. This charging method based on low voltage and high current will cause the wireless transmitting circuit and the wireless receiving circuit to generate a large amount of heat during the power transmission process.

In order to reduce the heat generation of the wireless transmitting circuit and the wireless receiving circuit, embodiments of the present disclosure further improve the above direct charging mode, and provide a step-down circuit between the wireless receiving circuit and the battery, and uses the output voltage of the step-down circuit as the charging voltage of the battery. Assuming that the charging power is 20 W, and the charging voltage/charging current of a single cell is 5V/4 A, in order to meet the requirement of the battery on the charging voltage, the output voltage/output current of the step-down circuit needs to be maintained at 5V/4 A. Assuming that the step-down circuit is a half-voltage circuit, the voltage before the step-down is 10V/2 A. In this way, the wireless transmitting circuit generates an electromagnetic signal based on 10V/2 A, and accordingly, the wireless receiving circuit converts the electromagnetic signal into an output voltage/output current of 10V/2 A, and the heat generated in the power transmission process is reduced accordingly due to the current being reduced from 4A to 2 A.

In the following, the wireless charging system 200 provided by an embodiment of the present disclosure is described in detail with reference to FIG. 2.

Figure 2:
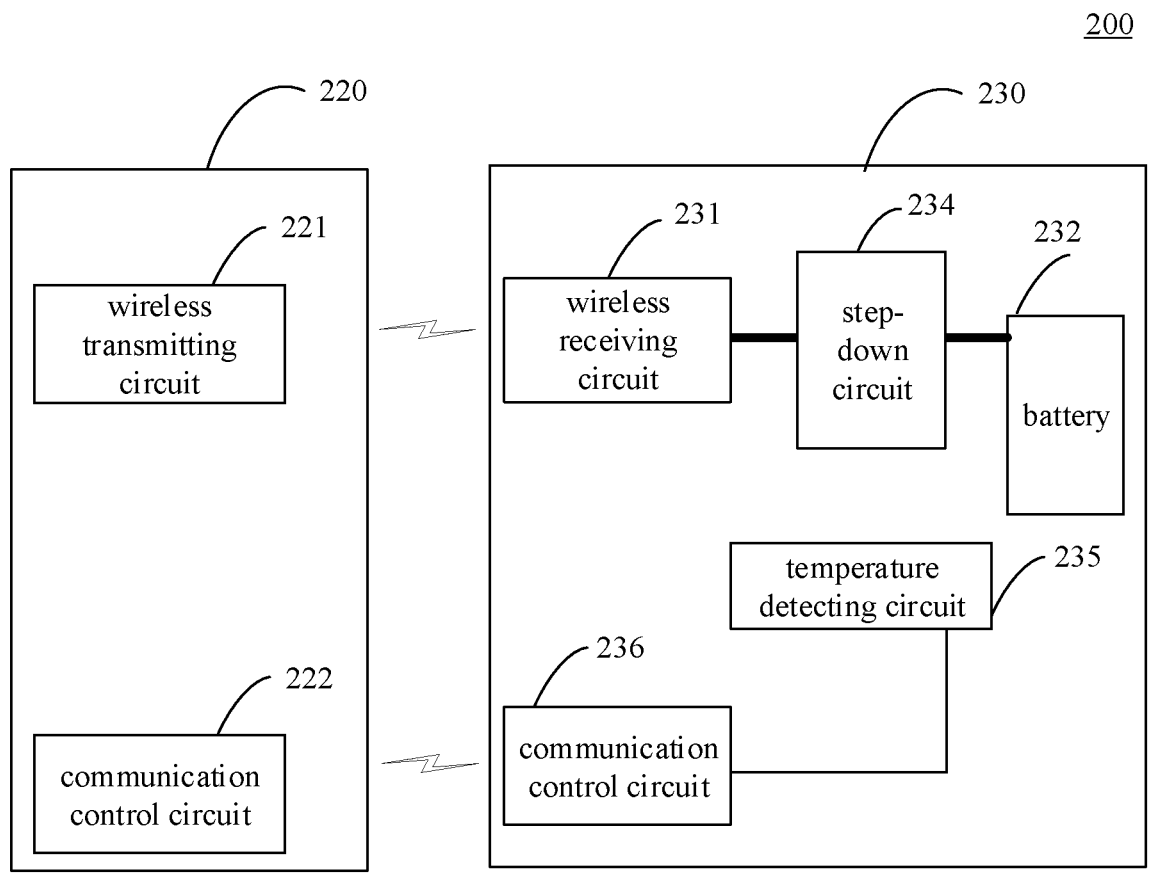
FIG. 2 is a schematic diagram of a wireless charging system according to an embodiment of the present disclosure.

As illustrated in FIG. 2, the wireless charging system provided by an embodiment of the present disclosure may include a wireless charging device 220 and a device to be charged 230.

The wireless charging device 220 may include a wireless transmitting circuit 221 and a communication control circuit 222. Control functions of the communication control circuit 222 may be implemented, for example, by a MCU (micro control unit).

The wireless transmitting circuit 221 may be configured to transmit an electromagnetic signal, to perform wireless charging on the device to be charged 230. In some embodiments, the wireless transmitting circuit 221 may include a wireless transmitter drive circuit and a transmitting coil or a transmitting antenna (not shown in drawings). The wireless transmitter drive circuit may be configured to generate an alternating current with a higher frequency. The transmitting coil or transmitting antenna may be configured to convert the alternating current with the higher frequency to the electromagnetic signal for transmission.

The communication control circuit 222 may be configured to perform wireless communication with the device to be charged 230 during the wireless charging. In detail, the communication control circuit 222 may communicate with a communication control circuit 236 in the device to be charged 230. In embodiments of the present disclosure, a communication mode between the communication control circuit 222 and the communication control circuit 236 and communication information between the communication control circuit 222 and the communication control circuit 236 are not limited, and will be described in detail below with reference to specific embodiments.

The device to be charged 230 may include a wireless receiving circuit 231, a battery 232, a step-down circuit 234, a temperature detecting circuit 235 and the communication control circuit 236. Control functions of the communication control circuit 236 may be implemented, for example, by a MCU (micro control unit), or may be implemented by the MCU together with an application processor in the device to be charged.

The wireless receiving circuit 231 may be configured to receive the electromagnetic signal, and to convert the electromagnetic signal to an output current and an output voltage of the wireless receiving circuit 231. In detail, the wireless receiving circuit 231 may include a receiving coil or receiving antenna (not shown), and a shaping circuit, such as a rectification circuit and/or a filtering circuit, coupled with the receiving coil or receiving antenna. The receiving coil or receiving antenna may be configured to convert the electromagnetic signal to alternating current. The shaping circuit may be configured to convert the alternating current to the output voltage and the output current of the wireless receiving circuit 231.

It should be noted that, in embodiments of the present disclosure, specific forms of the shaping circuit and forms of the output current and the output voltage of the wireless receiving circuit 231 obtained after shaping of the shaping circuit are not limited.

In some embodiments, the shaping circuit may include the rectification circuit and the filtering circuit, and the output voltage of the wireless receiving circuit 231 may be a stable voltage obtained after filtering. In other embodiments, the shaping circuit may include the rectification circuit, and the output voltage of the wireless receiving circuit 231 may be a voltage with a pulsating waveform obtained after rectification, in which the voltage with the pulsating waveform is directly applied to both ends of the battery 232 in the device to be charged 230 for charging the battery 232. There are many ways to adjust the output voltage of the wireless receiving circuit 231 to the voltage with the pulsating waveform, for example, by removing the filtering circuit in the wireless receiving circuit 231, and only remaining the rectification circuit.

It could be understood that, the output current of the wireless receiving circuit 231 may charge the battery 232 intermittently, and a period of the output current of the wireless receiving circuit 231 may vary with a frequency of the alternating current input into the wireless charging system 200 (for example, a frequency of the alternating current power grid). For example, a frequency corresponding to the period of the output current of the wireless receiving circuit 231 may be an integral multiple or a reciprocal multiple of the frequency of the power grid. Moreover, when the output current of the wireless receiving circuit 231 may charge the battery 232 intermittently, the current waveform corresponding to the output current of the wireless receiving circuit 231 may consist of one pulse or a set of pulses synchronous with the power grid. A magnitude of the voltage/current with the pulsating waveform changes periodically, which, compared to the conventional constant direct current, may reduce lithium precipitation of a lithium battery, and prolong a service life of the battery, and moreover may be beneficial to reduce polarization effect of the battery, improve a charging speed, and reduce heating of the battery, thus ensuring safety and reliability of charging the device to be charged.

The step-down circuit 234 may be configured to receive the output voltage of the wireless receiving circuit 231, perform a step-down process on the output voltage of the wireless receiving circuit 231 to obtain an output voltage and an output current of the step-down circuit 234, and charge the battery 232 based on the output voltage and output current of the step-down circuit 234.

The implementations of the step-down circuit 234 may be various. As an example, the step-down circuit 234 may be a Buck circuit. As another example, the step-down circuit 234 may be a charge pump.

The introduction of the step-down circuit 234 makes the voltage generated during the wireless transmission (e.g., the output voltage of the wireless receiving circuit) keep at a higher voltage, thereby further reducing the heat generation of the system.

The smaller the voltage difference between the input voltage and the output voltage of the step-down circuit 234 is, the higher the working efficiency of the step-down circuit 234 is, and the smaller the quantity of heat generation is. Accordingly, the larger the voltage difference between the input voltage and the output voltage of the step-down circuit 234 is, the lower the working efficiency of the step-down circuit 234 is, and the larger the quantity of heat generation is. Therefore, for the step-down circuit 234 with lower efficiency, more heat is generated during the step-down process.

Based on the above considerations, in embodiments of the present disclosure, a temperature detecting circuit 235 is provided. The communication control circuit 236 detects the temperature of the device to be charged 230 based on the temperature detecting circuit 235, to form a wireless charging system with a temperature feedback mechanism, which can monitor the temperature of the device to be charged 230, and increase the working efficiency of the step-down circuit 234 in time when the temperature of the device to be charged 230 is greater than a certain threshold, thereby reducing the heat generation of the system.

The temperature monitoring mechanism of the temperature detecting circuit 235 and the communication control circuit 236 will be described in detail below with reference to FIG. 2.

The temperature detecting circuit 235 may be configured to detect the temperature of the device to be charged 230. The temperature detecting circuit 235 may be implemented in various forms. For example, the temperature detecting circuit 235 may include a temperature detecting resistor. The temperature detecting resistor may be, for example, a thermistor. The temperature detecting circuit 235 may determine the temperature of the device to be charged 230 based on a resistance value of the thermistor.

The position of the temperature detecting circuit 235 in the device to be charged 230 is not specifically limited in embodiments of the present disclosure. As an example, the temperature detecting circuit 235 may be disposed near a heat source inside the device to be charged 230. For example, the temperature detecting resistor in the temperature detecting circuit 235 may be disposed in the vicinity of the step-down circuit 234. Assuming that the step-down circuit 234 is a BUCK IC, the temperature detecting resistor may be added to the BUCK IC. In this case, the temperature of the device to be charged 230 may also be understood as the temperature of the step-down circuit 234, that is, the temperature of the step-down circuit 234 is regarded as the temperature of the device to be charged 230.

The communication control circuit 236 may be configured to send feedback information to the wireless charging device 220, when the temperature of the device to be charged 230 is greater than a preset threshold. The feedback information is configured to trigger the wireless charging device 220 to control the wireless charging process, to reduce the output voltage of the wireless receiving circuit 231 ("reducing the output voltage of the wireless receiving circuit 231" herein may be replaced by "reducing the difference between the input voltage and the output voltage of the step-down circuit 234"; or, replaced by "increasing the working efficiency of the step-down circuit 234").

It should be noted that during the wireless charging process, the requirement for the charging voltage and the charging current of the battery 232 is generally determined by the charging phase in which the battery 232 is presently located. Since the charging voltage and the charging current of the battery 232 are the output voltage and output current of the step-down circuit 234, the output voltage and output current of the step-down circuit 234 are also determined by the charging phase in which the battery 232 is presently located. In order to increase the working efficiency of the step-down circuit 234, it is necessary to reduce the voltage difference between the input voltage and the output voltage of the step-down circuit 234. Since the output voltage of the step-down circuit 234 depends on the charging phase in which the battery 232 is presently located, it cannot be adjusted arbitrarily. Therefore, in order to reduce the voltage difference between the input voltage and the output voltage of the step-down circuit 234, the input voltage of the step-down circuit 234 may be reduced, that is, the output voltage of the wireless receiving circuit 231 may be reduced (in embodiments of the present disclosure, the output voltage of the wireless receiving circuit 231 and the input voltage of the step-down circuit 234 are the same voltage).

Therefore, in embodiments of the present disclosure, when the temperature of the device to be charged 230 is greater than the preset threshold, the feedback information is sent to the wireless charging device 220 through the communication control circuit 236, such that the wireless charging device 220 is triggered to control the wireless charging process to reduce the output voltage of the wireless receiving circuit 231.

The wireless charging device 220 may reduce the output voltage of the wireless receiving circuit 231 in various manners according to the feedback information.

As an example, the wireless charging device 220 may reduce a duty ratio of the wireless transmitting circuit 221 according to the feedback information, to reduce the output voltage of the wireless receiving circuit 231.

As another example, the wireless charging device 220 may adjust a transmitting frequency of the wireless transmitting circuit 221 according to the feedback information, to reduce the output voltage of the wireless receiving circuit 231.

As still another example, the wireless charging device 220 may reduce the output voltage of the voltage conversion circuit 224 to reduce the output voltage of the wireless receiving circuit 231. A detailed description of the structure and function of the voltage conversion circuit 224 will be described later with reference to FIGS. 5-6.

It should be noted that the wireless charging device 220 may reduce the output voltage of the wireless receiving circuit 231 by using a certain method described above, or may reduce the output voltage of the wireless receiving circuit 231 by using a combination of above methods. For example, the wireless charging device 220 may achieve the purpose of reducing the output voltage of the wireless receiving circuit 231 only by reducing the output voltage of the voltage conversion circuit 224. For another example, the wireless charging device 220 may first roughly adjust the output voltage of the wireless receiving circuit 231 (or the working efficiency of the step-down circuit 234) by reducing the output voltage of the voltage conversion circuit 224, and then finely adjust the output voltage of the wireless receiving circuit 231 (or the working efficiency of the step-down circuit 234) by adjusting the duty ratio and/or the transmitting frequency of the wireless transmitting circuit.

The specific content of the feedback information is not specifically limited in embodiments of the present disclosure. For example, the feedback information may be information indicating the temperature of the device to be charged 230. For another example, the feedback information may be information indicating that the temperature of the device to be charged 230 is too high. For example, when the wireless charging device 220 reduces the output voltage of the wireless receiving circuit 231 by reducing the output voltage of the voltage conversion circuit 224, the feedback information may be information indicating that the output voltage of the voltage conversion circuit 224 is too high. For example, when the wireless charging device 220 reduces the output voltage of the wireless receiving circuit 231 by adjusting the transmitting frequency and/or the duty ratio of the wireless transmitting circuit 221, the feedback information may be information indicating that the transmitting frequency and/or the duty ratio of the wireless transmitting circuit 221 is too high.

In some embodiments, the communication control circuit 236 may be further configured to perform wireless communication with the communication control circuit 222, such that the communication control circuit 222 controls the wireless charging process, to enable the output voltage and/or output current of the step-down circuit 234 to match the charging voltage and/or charging current presently required by the battery 232.

In other words, the communication control circuit 236 may be configured to perform wireless communication with the communication control circuit 222, such that the communication control circuit 222 controls the wireless charging process, to enable the output voltage and/or output current of the step-down circuit 234 to satisfy the charging requirements of the battery 232 in at least one of a trickle charging phase, a constant voltage charging phase, and a constant current charging phase.

The communication control circuit 236 may obtain the output voltage and/or the output current of the step-down circuit 234 through a certain detection circuit (such as a voltage detection circuit and/or a current detection circuit) or a certain detection mode, and may perform wireless communication with the communication control circuit 222 based on the output voltage and/or the output current of the step-down circuit 234.

The device to be charged used in embodiments of the present disclosure may refer to the "terminal". The "terminal" may include, but is not limited to a device configured to receive/transmit communication signals via a wired connection (for example, public switched telephone network (PSTN), digital subscriber line (DSL) connection, digital cable connection, direct cable connection and/or another data connection/network) and/or via a wireless interface (for example, cellular network, wireless local area network (WLAN), digital TV network such as digital video broadcasting handheld (DVB-H) network, satellite network, an amplitude modulation-frequency modulation (AM-FM) broadcasting transmitter, and/or a wireless interface of another communication terminal). The communication terminal configured to communicate via the wireless interface may be referred to as "wireless communication terminal", "wireless terminal" and/or "mobile terminal". Examples of a mobile terminal include, but are not limited to a satellite phone or a cell phone, a terminal combining a cell radio phone and a personal communication system (PCS) having capability of data process, fax, and data communication, a personal digital assistant (PDA) including a radio phone, a pager, Internet/Intranet access, a web browser, a note pad & address book, a calendar and/or a global positioning system (GPS) receiver, and a common laptop and/or handheld receiver, or other electronic devices including a radio phone transceiver. In addition, the device to be charged or terminal used in embodiments of the present disclosure may further include a power bank. The power bank may receive charging from the wireless charging device, and store the energy, for providing power for other electronic devices.

The communication mode and the communication sequence between the wireless charging device 220 and the device to be charged 230 are not limited in embodiments of the present disclosure.

In some embodiments, the wireless communication between the wireless charging device 220 and the device to be charged 230 (or, between the communication control circuit 236 and the communication control circuit 222) may be a unidirectional wireless communication. For example, during the wireless charging of the battery 232, the device to be charged 230 may be an initiator of the communication, and the wireless charging device 220 may be a receiver of the communication. For example, during the constant current charging stage of the battery, the device to be charged 230 may detect the charging current of the battery 232 (i.e., the output current of the wireless receiving circuit 231) in real time, and when the charging current of the battery 232 does not match the charging current presently required by the battery, the device to be charged 230 sends an adjustment message to the wireless charging device 220, to instruct the wireless charging device 220 to adjust the transmitting power of the wireless transmitting circuit 221.

In some embodiments, the wireless communication between the wireless charging device 220 and the device to be charged 230 (or, between the communication control circuit 236 and the communication control circuit 222) may be a bidirectional wireless communication. The bidirectional wireless communication generally requires that, the receiver sends a response message to the initiator after receiving the communication request initiated by the initiator. The bidirectional communication scheme may enable the communication to be safer.

The master-slave relation of the wireless charging device 220 (the communication control circuit 222 in the wireless charging device 220) and the device to be charged 230 (the communication control circuit 236 in the device to be charged 230) is not limited by above description of embodiments of the present disclosure. In other words, any of the wireless charging device 220 and the device to be charged 230 can be configured as the master device for initiating the bidirectional communication session, accordingly, the other one can be configured as the slave device for making a first response or a first reply to the communication initiated by the master device. As a feasible implementation, during the communication, the identities of the master device and the slave device can be determined by comparing the link states between the wireless charging device 220 and the device to be charged 230. For example, assume that the wireless link of sending messages from the wireless charging device 220 to the device to be charged 230 is the uplink, and the wireless link of sending messages from the device to be charged 230 to the wireless charging device is the downlink. If the link quality of the uplink is better, the wireless charging device 220 may be configured as the master device of the communication. If the link quality of the downlink is better, the device to be charged 230 may be configured as the master device of the communication.

The specific implementation of bidirectional communication between the wireless charging device 220 and the device to be charged 230 is not limited in embodiments of the present disclosure. In other words, any of the wireless charging device 220 and the device to be charged 230 can be configured as the master device for initiating the bidirectional communication session, accordingly, the other one can be configured as the slave device making a first response or a first reply to the communication initiated by the master device, and the master device is able to make a second response to the first response or the first reply of the slave device, and thus one negotiation process is completed between the master device and the slave device.

As an implementation, the mater device is able to make a second response to the first response or the first reply made by the slave device with respect to the communication session in a manner that, the master device is able to receive the first response or the first reply made by the slave device with respect to the communication session and to make a targeted second response to the first response or the first reply.

As another implementation, the mater device is able to make a second response to the first response or the first reply made by the slave device with respect to the communication session in a manner that, when the master device does not receive the first response or the first reply made by the slave device with respect to the communication session in the predetermined time period, the mater device also makes the targeted second response to the first response or the first reply of the slave device.

In some embodiments, when the device to be charged 230 is configured as the mater device for initiating the communication session, after the wireless charging device 220 configured as the slave device makes the first response or the first reply to the communication session initiated by the master device, it is unnecessary for the device to be charged 230 to make the targeted second response to the first response or the first reply of the wireless charging device 220, i.e., one negotiation process is regarded as completed between the wireless charging device 220 and the device to be charged 230.

In embodiments of the present disclosure, the wireless communication mode between the communication control circuit 222 of the wireless charging device 220 and the communication control circuit 236 of the device to be charged 230 is not limited. For example, the communication control circuit 222 and the communication control circuit 236 may perform the wireless communication based on Bluetooth, Wi-Fi (wireless fidelity) or backscatter modulation (or power load modulation).

In embodiments of the present disclosure, communication content between the communication control circuit 236 and the communication control circuit 222 is not limited. Besides the feedback information related to the temperature, other communication information may be included, which will be described in detail below with reference to detailed embodiments.

As an example, the communication control circuit 236 may send the output voltage and/or the output current of the step-down circuit 234 to the communication control circuit 222. Further, the communication control circuit 236 may further send battery status information to the communication control circuit 222, in which the battery status information includes a present electric quantity and/or a present voltage of the battery 232 in the device to be charged 230. The communication control circuit 222 may first determine the charging stage where the battery 232 is presently is according to the battery status information, and further determine a target charging voltage and/or a target charging current matching the charging voltage and/or the charging current presently required by the battery 232. Next, the communication control circuit 222 may compare the output voltage and/or the output current of the step-down circuit 234 sent from the communication control circuit 236 with the target charging voltage and/or the target charging current, to determine whether the output voltage and/or the output current of the step-down circuit 234 match the charging voltage and/or the charging current presently required by the battery 232. When the output voltage and/or the output current of the step-down circuit 234 does not match the charging voltage and/or the charging current presently required by the battery 232, the transmitting power of the wireless transmitting circuit 221 is adjusted, until the output voltage and/or the output current of the step-down circuit 234 match the charging voltage and/or the charging current presently required by the battery 232.

As another example, the communication control circuit 236 may send the adjustment message to the communication control circuit 222, to instruct the communication control circuit 222 to adjust the transmitting power of the wireless transmitting circuit 221. For example, the communication control circuit 236 may instruct the communication control circuit 222 to increase the transmitting power of the wireless transmitting circuit 221. For another example, the communication control circuit 236 may instruct the communication control circuit 222 to decrease the transmitting power of the wireless transmitting circuit 221. In more detail, the wireless charging device 220 may set a plurality of levels for the transmitting power of the wireless transmitting circuit 221. Every time when the communication control circuit 222 receives the adjustment message, it adjusts the transmitting power of the wireless transmitting circuit 221 by one level until the output voltage and/or the output current of the step-down circuit 234 match the charging voltage and/or the charging current presently required by the battery 232.

Besides the above communication contents, many other communication information may be communicated between the communication control circuit 222 and the communication control circuit 236. In some embodiments, information used for safety protection, abnormality detection or failure processing, for example, temperature information of the battery 232, information indicating entering overvoltage protection or overcurrent protection, and power transmission efficiency information (the power transmission efficiency information may be configured to indicate a power transmission efficiency between the wireless transmitting circuit 221 and the wireless receiving circuit 231), may be communicated between the communication control circuit 222 and the communication control circuit 236.

For example, when the temperature of the battery 232 is too high, the communication control circuit 222 and/or the communication control circuit 236 may control the charging loop to enter a protection stage, for example, control the charging loop to stop the wireless charging. For another example, after the communication control circuit 222 receives the information indicating the overvoltage protection or the overcurrent protection sent by the communication control circuit 236, the communication control circuit 222 may reduce the transmitting power, or control the wireless transmitting circuit 221 to stop working. For another example, after the communication control circuit 222 receives the power transmission efficiency information sent by the communication control circuit 236, the communication control circuit 222 may control the wireless transmitting circuit 221 to stop working if the power transmission efficiency is lower than a preset threshold, and inform the user of this matter, for example, may display via the display screen that the power transmission efficiency is too low, or may indicate via an indicator light that the power transmission efficiency is too low, such that the user may adjust the environment of the wireless charging.

In some embodiments, other information that can be used to adjust the transmitting power of the wireless transmitting circuit 221, for example, the temperature information of the battery, the information indicating a peak value or a mean value of the output voltage and/or the output current of the step-down circuit 234, and the power transmission efficiency information (the power transmission efficiency information may be configured to indicate the power transmission efficiency between the wireless transmitting circuit 221 and the wireless receiving circuit 231), may be communicated between the communication control circuit 222 and the communication control circuit 236.

For example, the communication control circuit 236 may send the power transmission efficiency information to the communication control circuit 222, and the communication control circuit is further configured to determine an adjustment magnitude of the transmitting power of the wireless transmitting circuit 221 according to the power transmission efficiency information. In detail, if the power transmission efficiency information indicates that the power transmission efficiency between the wireless transmitting circuit 221 and the wireless receiving circuit 231 is low, the communication control circuit 222 may increase the adjustment magnitude of the transmitting power of the wireless transmitting circuit 221, such that the transmitting power of the wireless transmitting circuit 221 may reach the target power faster.

For another example, when the wireless receiving circuit 231 outputs the voltage and/or the current with the pulsating waveform, the communication control circuit 236 may send the information indicating the peak value or the mean value of the output voltage and/or the output current of the step-down circuit 234 to the communication control circuit 222, and the communication control circuit 222 may determine whether the peak value or the mean value of the output voltage and/or the output current of the step-down circuit 234 matches the charging voltage and/or the charging current presently required by the battery, and if not, may adjust the transmitting power of the wireless transmitting circuit 221.

For another example, the communication control circuit 236 may send the temperature information of the battery 232 to the communication control circuit 222, and if the temperature of the battery 232 is too high, the communication control circuit 222 may reduce the transmitting power of the wireless transmitting circuit 221, to reduce the output current of the wireless receiving circuit 231, thus reducing the temperature of the battery 232.

Figure 3:
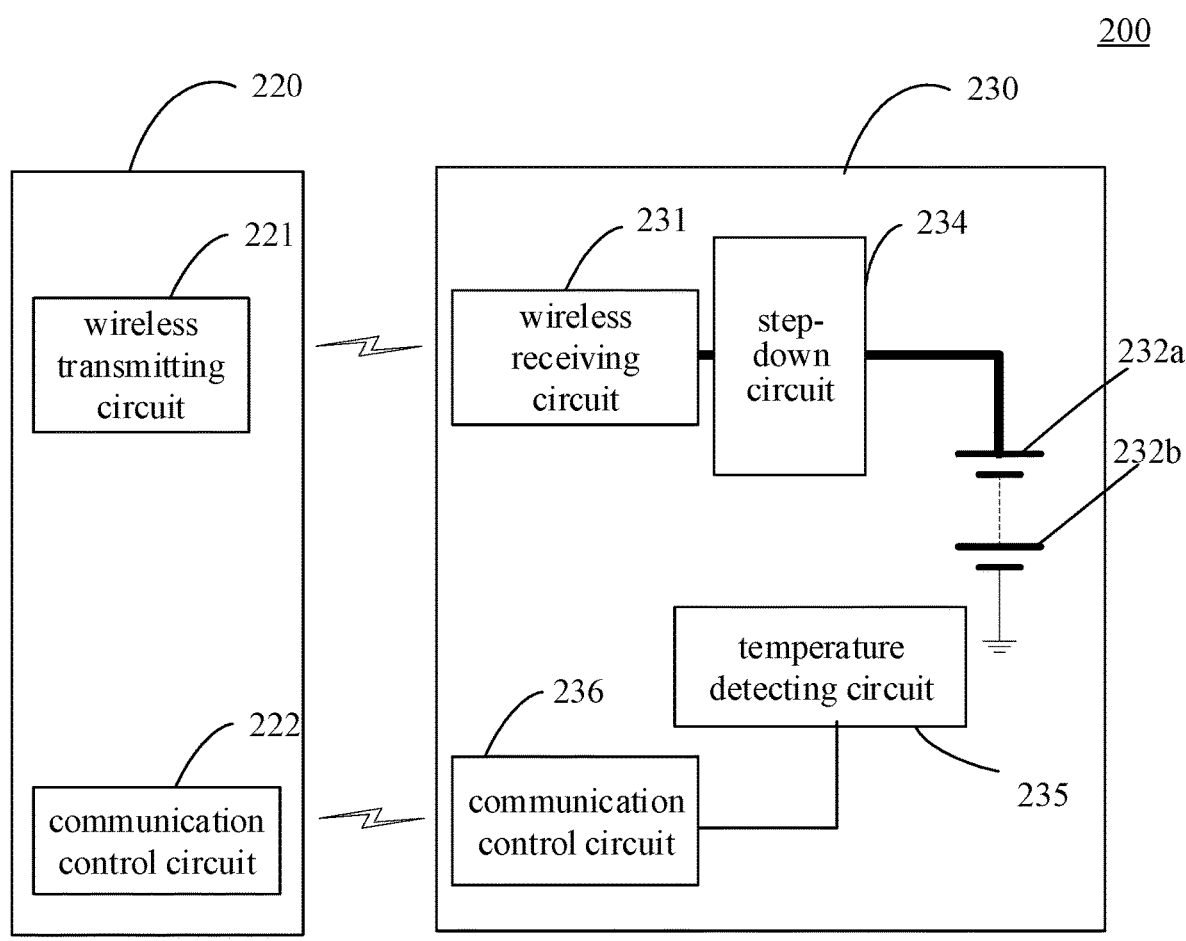
FIG. 3 is a schematic diagram of a wireless charging system according to another embodiment of the present disclosure.

The battery 232 in the wireless charging device 220 provided by the embodiments of the present disclosure may include a single cell, and may also include N cells (N is a positive integer greater than 1) connected in series with each other. Taking N=2 as an example, as illustrated in FIG. 3, the battery 232 may include a cell 232*a* and a cell 232*b*, and the cell 232*a* and the cell 232*b* are connected in series with each other. Assuming that the charging power is 20 W, and the charging voltage of a single cell is 5V, in order to meet the charging voltage requirements of the serial double cells, the output voltage/output current of the step-down circuit 234 needs to be maintained at 10V/2 A. In this case, the wireless transmitting circuit generates electromagnetic signals based on 10V/2 A, and accordingly, the wireless receiving circuit converts the electromagnetic signals into an output voltage/output current of 10V/2 A, and the heat generated in the power transmission process is reduced accordingly due to the current being reduced from 4 A to 2 A. FIG. 3 is an example in which N=2, but actually, the value of N may be 3 or a positive integer of 3 or more. The more cells are connected in series, the smaller the amount of heat generated by the electric energy passing through the wireless transmitting circuit 221 and the wireless receiving circuit 231.

In some embodiments, the device to be charged includes the step-down circuit 234 as illustrated in FIG. 2, and the battery 232 of the device to be charged 230 includes N cells (N is a positive integer greater than 1) connected in series with each other. Assuming that the charging power is 20 W, and the charging voltage of a single cell is equal to 5V, in order to meet the charging voltage requirements of the series double cells, the output voltage/output current of the step-down circuit 234 needs to be maintained at 10V/2 A. Assuming that the step-down circuit 234 is a half-voltage circuit, the voltage before the step-down process is 20V/1 A. In this way, the wireless transmitting circuit generates electromagnetic signals based on 20V/1 A, and accordingly, the wireless receiving circuit converts the electromagnetic signals into an output voltage/output current of 20V/1 A, which further reduces the heat generated in the power transmission process due to the current being reduced from 4 A to 1 A.

As noted above, in embodiments of the present disclosure, the wireless charging device 220 can adjust the transmitting power of the wireless transmitting circuit 221 constantly during the charging process, such that the output voltage and/or the output current of the step-down circuit 234 match the charging voltage and/or the charging current presently required by the battery 232. In embodiments of the present disclosure, the way of adjusting the transmitting power of the wireless transmitting circuit is not limited. For example, the communication control circuit 222 may communicate with the power supply device 210 to adjust the output current and/or the output voltage of the power supply device 210, so as to adjust the transmitting power of the wireless transmitting circuit 221. As another example, the communication control circuit 222 may adjust a power quantity drawn by the wireless transmitting circuit 221 from the maximum output power supplied by the power supply device 210, so as to adjust the transmitting power of the wireless transmitting circuit 221. As another example, the wireless charging device 220 may directly receive alternating current (for example, 220V alternating current), and the communication control circuit 222 may directly convert the alternating current to the required voltage and/or current according to feedback from the communication control circuit 236. In the following, the way of adjusting the transmitting power of the wireless transmitting circuit 221 is described in detail with reference to FIGS. 4-6.

Figure 4:
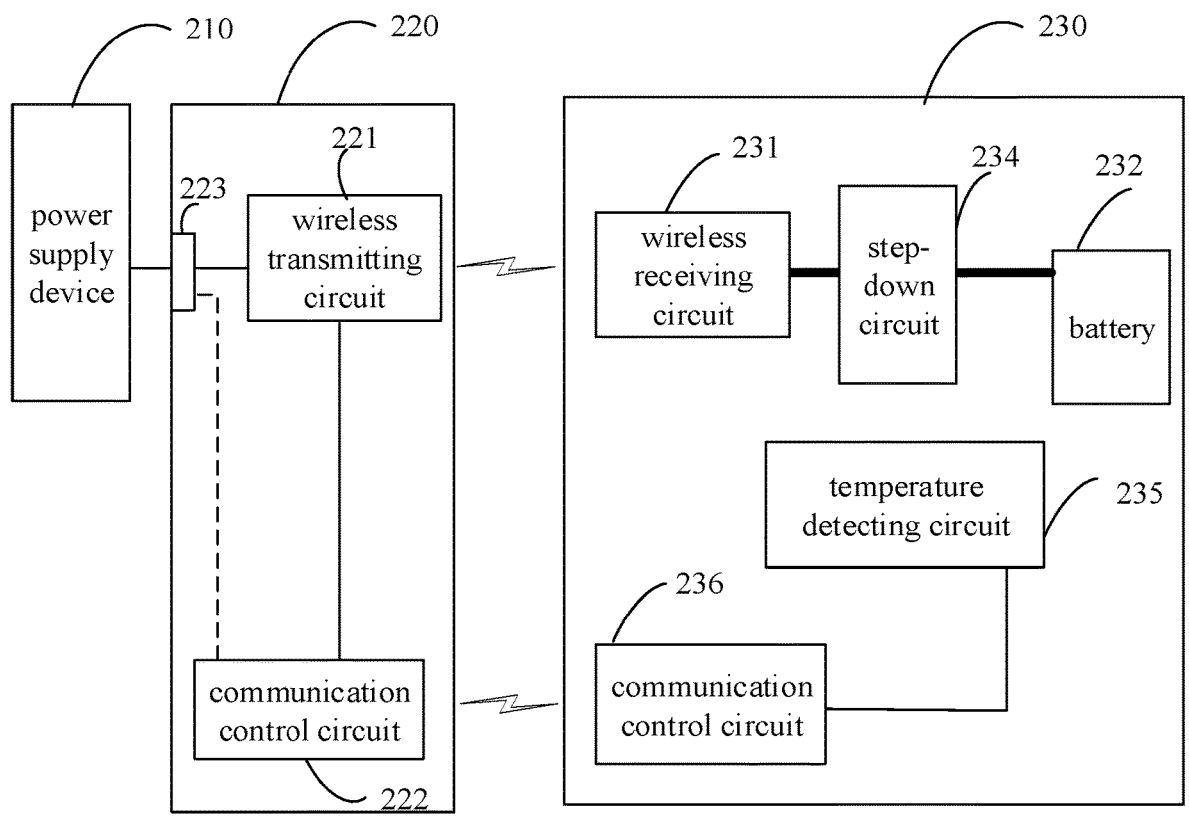
FIG. 4 is a schematic diagram of a wireless charging system according to yet another embodiment of the present disclosure.

FIG. 4 is an example of a method of adjusting the transmitting power of the wireless transmitting circuit 221. As illustrated in FIG. 4, the wireless charging device 220 may further include a charging interface 223. The charging interface 223 may be configured to couple to an external power supply device 210. The wireless transmitting circuit 221 may be further configured to generate the electromagnetic signal according to the output voltage and the output current of the power supply device 210. The communication control circuit 222 may be further configured to communicate with the power supply device 210 to negotiate the maximum output power of the power supply device 210, and adjust the power quantity drawn by the wireless transmitting circuit 221 from the maximum output power during the wireless charging, to adjust the transmitting power of the wireless transmitting circuit 221.

In embodiments of the present disclosure, the communication control circuit 222 communicates with the power supply device 210 having the adjustable output power, to negotiate the maximum output power of the power supply device 210. After the negotiation, the power supply device 210 may provide the output voltage and the output current to the wireless charging device 220 according to the maximum output power. During the charging, the communication control circuit 222 may draw a certain power quantity from the maximum output power for wireless charging. In other words, in embodiments of the present disclosure, adjusting the transmitting power of the wireless transmitting circuit 221 is controlled by the communication control circuit 222, which may adjust the transmitting power of the wireless transmitting circuit 221 immediately after receiving the feedback information of the device to be charged 230, having advantages of fast adjustment speed and high efficiency.

In embodiments of the present disclosure, the way in which the communication control circuit 222 draws the power quantity from the maximum output power provided by the power supply device 210 is not limited. For example, the voltage conversion circuit (for example, may be the power adjustment circuit) may be arranged inside the wireless charging device 220. The voltage conversion circuit may be coupled with the transmitting coil or transmitting antenna, for adjusting the power received by the transmitting coil or transmitting antenna. The voltage conversion circuit may include, for example, a PWM (pulse width modulation) controller and a switch unit. The communication control circuit 222 may adjust the transmitting power of the wireless transmitting circuit 221 by adjusting a duty ratio of a control signal sent by the PWM controller, and/or by controlling a switch frequency of the switch unit.

It should be noted that, in an embodiment as illustrated in FIG. 4, as an alternative implementation, the power supply device 210 may have the fixed and higher output power (for example, 40 W). In this way, the communication control circuit 222 may not need to negotiate with the power supply device 210 about the maximum output power of the power supply device 210, and may directly adjust the power quantity drawn by the wireless transmitting circuit 221 from the fixed power supplied by the power supply device 210.

In embodiments of the present disclosure, a type of the power supply device 210 is not limited. For example, the power supply device 210 may be an adapter, a power bank, a car charger, a computer or the like.

In embodiments of the present disclosure, a type of the charging interface 223 is not limited. In some embodiments, the charging interface 223 may be a USB interface. The USB interface may be, for example, a USB 2.0 interface, a micro USB interface, or a USB TYPE-C interface. In other embodiments, the charging interface 223 may also be a lightning interface, or any other kind of parallel interface and/or serial interface that can be used for charging.

In embodiments of the present disclosure, a communication mode between the communication control circuit 222 and the power supply device 210 is not limited. As an example, the communication control circuit 222 may be coupled with the power supply device 210 via a communication interface other than the charging interface, and may communicate with the power supply device 210 via the communication interface. As another example, the communication control circuit 222 may communicate with the power supply device 210 in a wireless mode. For example, the communication control circuit 222 may communicate with the power supply device 210 via NFC (near field communication). As yet another example, the communication control circuit 222 may communicate with the power supply device 210 via the charging interface, without the need of arranging an additional communication interface or other wireless communication modes, such that an implementation of the wireless charging device 220 may be simplified. For example, the charging interface 223 is the USB interface, and the communication control circuit 222 may communicate with the power supply device 210 based on a data wire (such as D+ and/or D− wire) of the USB interface. For another example, the charging interface 223 may be the USB interface supporting a PD (power delivery) communication protocol, and the communication control circuit 222 may communicate with the power supply device 210 based on the PD communication protocol.

In embodiments of the present disclosure, the manner in which the power supply device 210 adjusts the output power is not specifically limited. For example, the power supply device 210 can be internally provided with a voltage feedback loop and a current feedback loop to enable adjustment of its output voltage and/or output current according to practical requirements.

Figure 5:
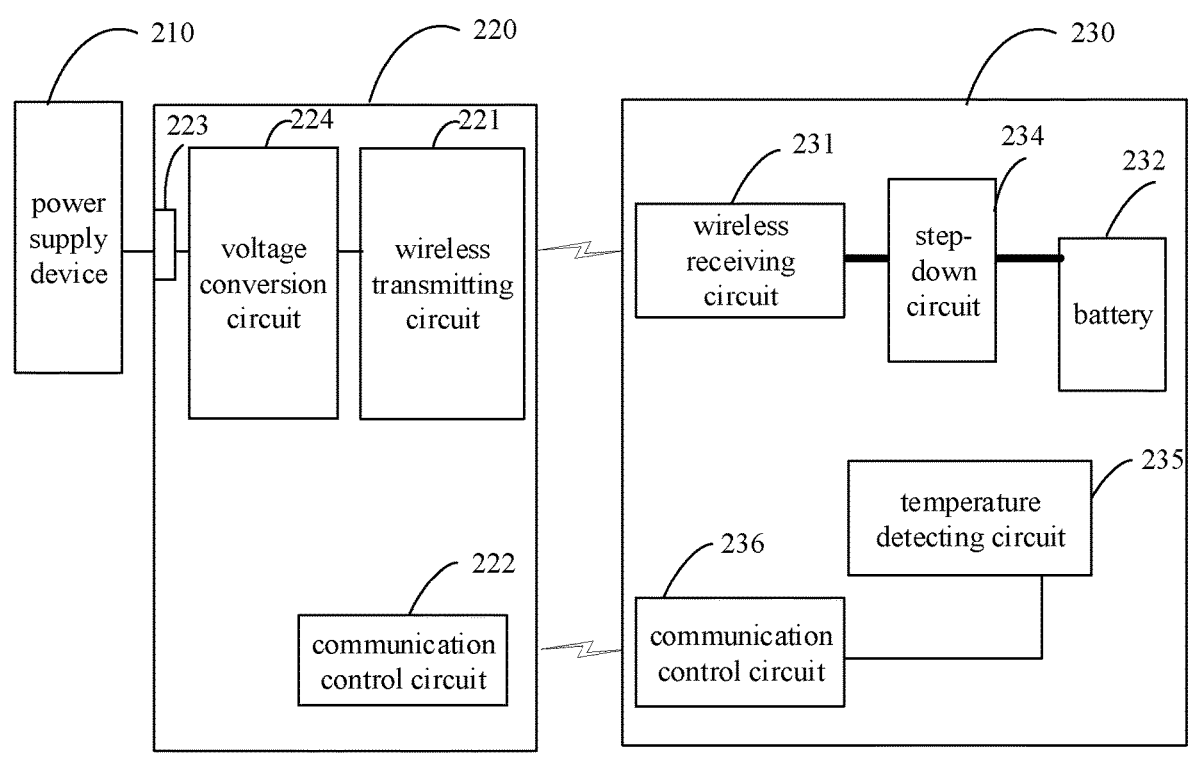
FIG. 5 is a schematic diagram of a wireless charging system according to still another embodiment of the present disclosure.

FIG. 5 is another example of a method of adjusting the transmitting power of the wireless transmitting circuit 221 according to an embodiment of the present disclosure. Different from FIG. 4, the embodiment illustrated in FIG. 5 is not intended to control the maximum output power of the power supply device 210, but to relatively accurately control the output power of the power supply device 210, so as to make the output power of the power supply device 210 directly meet the present power requirements. Moreover, in contrast to the embodiment in FIG. 4, in the embodiment as illustrated in FIG. 5, adjusting the transmitting power of the wireless transmitting circuit 221 is controlled by the power supply device, which adjusts the transmitting power of the wireless transmitting circuit 221 by changing the output voltage and/or the output current. This way of adjusting the transmitting power is advantageous in that, the power supply device 210 may provide as much power as the wireless charging device 220 needs, thus avoiding waste of power. In the following, detailed description is provided with reference to FIG. 5.

As illustrated in FIG. 5, the wireless charging device 220 provided by embodiments of the present disclosure may further include a charging interface 223 and a voltage conversion circuit 224. The charging interface 223 may be configured to be coupled to the power supply device 210. The voltage conversion circuit 224 may be configured to receive an output voltage of the power supply device 210 and convert the output voltage of the power supply device 210 to obtain an output voltage and an output current of the voltage conversion circuit 224. The wireless transmitting circuit 221 may be further configured to generate the electromagnetic signal according to the output voltage and the output current of the voltage conversion circuit 224. The communication control circuit 222 may be further configured to communicate with the power supply device 210 to negotiate the output voltage and/or output current of the power supply device 210.

In embodiments of the present disclosure, the energy transmission is performed by using a high-voltage low-current method. This energy transmission mode requires a high input voltage (for example, 10V or 20V) of the wireless transmitting circuit 221, and if the maximum output voltage of the power supply device 210 cannot reach the input voltage requirement of the wireless transmitting circuit 221, the setting of the voltage conversion circuit 224 may make it impossible for the input voltage of the wireless transmitting circuit 221 to reach a desired input voltage. Of course, in some embodiments, if the output voltage of the power supply device 210 can reach the input voltage requirement of the wireless transmitting circuit 221, the voltage conversion circuit 224 can also be omitted to simplify the implementation of the wireless charging device 220.

The voltage conversion circuit 224 may be a voltage boosting circuit. The boosting factor of the voltage conversion circuit 224 and the step-down factor of the step-down circuit 234 are related to parameters such as the output voltage that can be provided by the power supply device 210, and the charging voltage required by the battery 232. The boosting factor and the step-down factor may be equal or non-equal, which are not specifically limited in this embodiment of the present disclosure. As an implementation, the boosting factor of the voltage conversion circuit 224 and the step-down factor of the step-down circuit 234 may be set equal. For example, the voltage conversion circuit 224 may be a voltage doubling circuit for boosting the output voltage of the power supply device 210 by a factor of two; the step-down circuit 234 may be a half voltage circuit for reducing the output voltage of the wireless receiving circuit 231 by half.

In embodiments of the present disclosure, the boosting factor of the voltage conversion circuit 224 and the step-down factor of the step-down circuit 234 is set to 1:1. This arrangement can make the output voltage and the output current of the step-down circuit 234 consistent with those of the power supply device 210 respectively, which facilitates simplifying the implementation of the communication control circuits 222, 236. Taking the requirement of the charging current of the battery 232 being 5 A as an example, when the communication control circuit 236 learns that the output current of the step-down circuit 234 is 4.5 A, it is necessary to adjust the output power of the power supply device 210, so that the output current of the step-down circuit 234 reaches 5 A. If the ratio of the boosting factor of the voltage conversion circuit 224 and the step-down factor of the step-down circuit 234 is not equal to 1:1, the communication control circuit 222 or the communication control circuit 236, when adjusting the output power of the power supply device 210, needs to recalculate the adjustment value of the output power of the power supply device 210 based on the difference between the present output current of the step-down circuit 234 and the expected value. In embodiments of the present disclosure, the ratio of the boosting factor of the voltage conversion circuit 224 and the step-down factor of the step-down circuit 234 is set to 1:1, and the communication control circuit 236 notifies the communication control circuit 222 to increase the output current to 5 A, which simplifies the feedback adjustment manner of the wireless charging channel.

In the embodiment as illustrated in FIG. 5, the wireless charging device 220 may take the initiative to determine whether there is a need to adjust the output voltage and/or the output current of the power supply device. In other embodiments, the wireless charging device 220 may act as a bridge for communication between the power supply device 210 and the device to be charged 230, and is mainly responsible for forwarding information between the two.

For example, during the wireless charging, the communication control circuit 222 communicates with the device to be charged 230, to determine whether there is a need to adjust the output voltage and/or the output current of the power supply device 210. When there is a need to adjust the output voltage and/or the output current of the power supply device 210, the communication control circuit 222 communicates with the power supply device 210 to instruct the power supply device 210 to adjust the output voltage and/or the output current of the power supply device 210.

For another example, during the wireless charging, the communication control circuit 222 in the wireless charging device 220 performs wireless communication with the device to be charged 230 to obtain an adjustment message, in which the adjustment message is configured to instruct adjusting the output voltage and/or the output current of the power supply device 210. The communication control circuit 222 communicates with the power supply device 210 to send the adjustment message to the power supply device 210, such that the power supply device 210 adjusts the output voltage and/or the output current of the power supply device according to the adjustment message.

It should be understood that, similar to the communication mode between the wireless charging device 220 and the device to be charged 230, the communication between the wireless charging device (or the communication control circuit 222) and the power supply device 210 may be the unidirectional communication, or may be the bidirectional communication, which is not limited in embodiments of the present disclosure.

It should also be understood that, the output current of the power supply device may be constant direct current, pulsating direct current or alternating current, which is not limited in embodiments of the present disclosure.

In the embodiment as illustrated in FIG. 5, the communication control circuit 222 may be coupled to the wireless transmitting circuit 221, so that the wireless transmitting circuit 221 may be controlled to start working, or the wireless transmitting circuit 221 may be controlled to stop working when the wireless charging process is abnormal. In some embodiments, the communication control circuit 222 may not be coupled to the wireless transmitting circuit 221.

Figure 6:
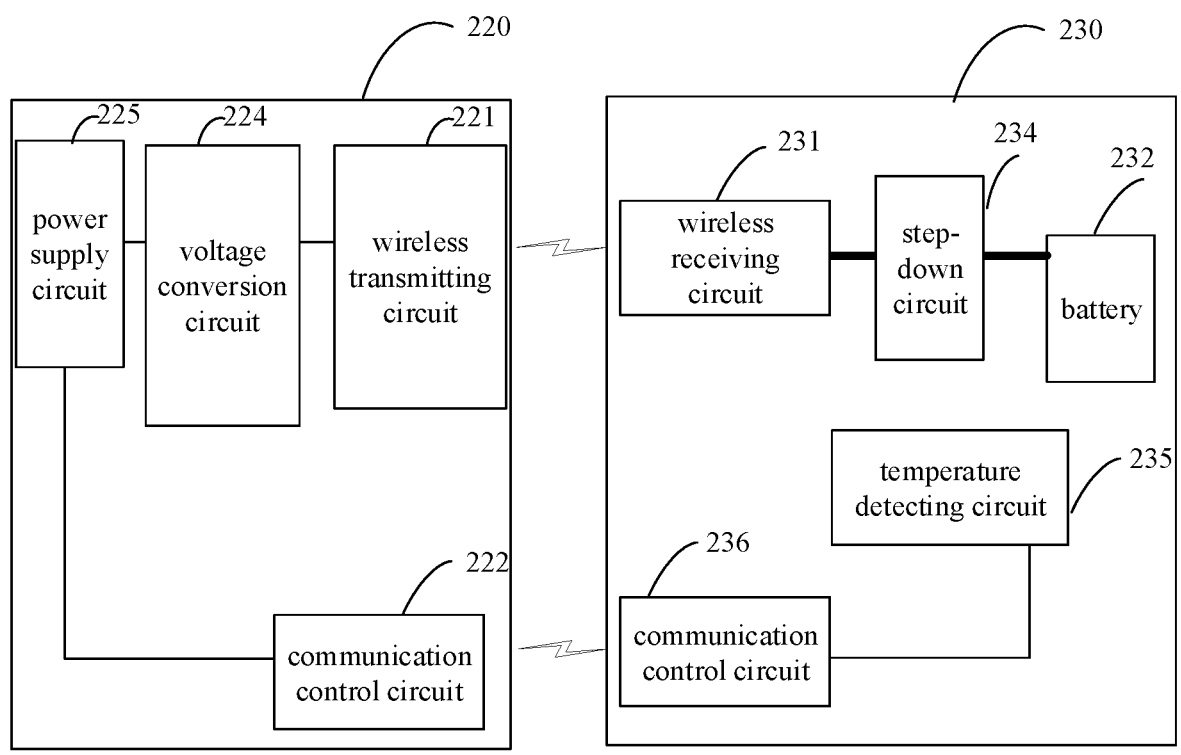
FIG. 6 is a schematic diagram of a wireless charging system according to still yet another embodiment of the present disclosure.

FIG. 6 is another example of the transmitting power adjustment manner of the wireless transmitting circuit 221. Different from the embodiments illustrated in FIGS. 4 and 5, the wireless charging device 220 corresponding to the embodiment of FIG. 6 does not acquire electric energy from the power supply device 210, but directly converts the alternating current input from the external (such as the mains supply) into the electromagnetic signal.

As illustrated in FIG. 6, the wireless charging device 220 may further include a voltage conversion circuit 224 and a power supply circuit 225. The power supply circuit 225 may be configured to receive the alternating current input from the external (such as the mains supply) and generate an output voltage and an output current of the power supply circuit 225 according to the alternating current. For example, the power supply circuit 225 may perform rectification and/or filtering on the alternating current to obtain direct current or pulsating direct current and transmit the direct current or the pulsating direct current to the voltage conversion circuit 224.

The voltage conversion circuit 224 may be configured to receive the output voltage of the power supply circuit 225 and convert the output voltage of the power supply circuit 225 to obtain the output voltage and output current of the voltage conversion circuit 224. The wireless transmitting circuit 221 may be further configured to generate the electromagnetic signal according to the output voltage and the output current of the voltage conversion circuit 224.

In embodiments of the present disclosure, the function similar to the adapter is integrated in the wireless charging device 220, such that the wireless charging device 220 does not need to obtain power from the external power supply device, which improves the integration level of the wireless charging device 220, and reduces the number of elements required for the wireless charging.

In embodiments of the present disclosure, the energy transmission is performed by using a high-voltage low-current method. This energy transmission mode requires a high input voltage (for example, 10V or 20V) of the wireless transmitting circuit 221, and if the maximum output voltage of the power supply circuit 225 cannot reach the input voltage requirement of the wireless transmitting circuit 221, the setting of voltage conversion circuit 224 may make it impossible for the input voltage of wireless transmitting circuit 221 to reach the desired input voltage. Of course, in some embodiments, if the output voltage of the power supply circuit 225 can reach the input voltage requirement of the wireless transmitting circuit 221, the voltage conversion circuit 224 can also be omitted to simplify the implementation of the wireless charging device 220.

In some embodiments, the wireless charging device 220 may support a first wireless charging mode and a second wireless charging mode, in which a charging speed of the wireless charging device 220 charging the device to be charged 230 in the first wireless charging mode is greater than a charging speed of the wireless charging device 220 charging the device to be charged 230 in the second wireless charging mode. In other words, compared to the wireless charging device 220 working in the second wireless charging mode, the wireless charging device 220 working in the first wireless charging mode can fully charge the battery having the same capacity in the device to be charged 230 in a shorter time period.

The second wireless charging mode may be referred to as a normal wireless charging mode, which may be, for example, the conventional wireless charging mode based on QI standard, PMA standard or A4WP standard. The first wireless charging mode may be referred to as a fast wireless charging mode. The normal wireless charging mode may refer to the wireless charging mode in which the transmitting power of the wireless charging device 220 is relatively lower (typically, less than 15 W, and the commonly used transmitting power is 5 W or 10 W). In the normal wireless charging mode, it may take several hours to fully charge a larger capacity battery (such as a battery with 3000 mAh). In contrast, under the fast wireless charging mode, the transmitting power of the wireless charging device 220 is relatively higher (typically, greater than or equal to 15 W). Compared to the normal wireless charging mode, the charging speed of the wireless charging device 220 in the fast wireless charging mode is faster, and the charging time required for fully charging a battery with a same capacity in the fast wireless charging mode may be significantly shortened.

In some embodiments, the communication control circuit 222 performs the bidirectional communication with the communication control circuit 236, to control the transmitting power of the wireless charging device 220 in the first wireless charging mode.

Further, in some embodiments, the communication control circuit 222 may perform the bidirectional communication with the communication control circuit 236 to control the transmitting power of the wireless charging device 220 in the first wireless charging mode as follows. The communication control circuit 222 performs the bidirectional communication with the communication control circuit 236 to negotiate the wireless charging mode between the wireless charging device 220 and the device to be charged 230.

In detail, the communication control circuit 222 may perform handshake communication with the communication control circuit 236, control the wireless charging device 220 to charge the device to be charged 230 in the first wireless charging mode when the handshake communication succeeds, and control the wireless charging device 220 to charge the device to be charged 230 in the second wireless charging mode when the handshake communication fails.

The handshake communication may refer to recognize the other's identity by any of the communication parties. When the handshake communication succeeds, it indicates that both the wireless charging device 220 and the device to be charged 230 support the wireless charging mode with adjustable transmitting power provided by embodiments of the present disclosure. When the handshake communication fails, it indicates that at least one of the wireless charging device 220 and the device to be charged 230 does not support the wireless charging mode with adjustable transmitting power provided by embodiments of the present disclosure.

In embodiments of the present disclosure, the wireless charging device 220 does not perform the fast wireless charging on the device to be charged 230 in the first wireless charging mode blindly, but performs the bidirectional communication with the device to be charged 230 to negotiate whether the wireless charging device 220 can perform the fast wireless charging on the device to be charged 230 in the first wireless charging mode. In this way, safety of charging process can be improved.

In detail, the communication control circuit 222 performs the bidirectional communication with the communication control circuit 236 to negotiate the wireless charging mode between the wireless charging device 220 and the device to be charged 230 as follows. The communication control circuit 222 sends a first instruction to the communication control circuit 236, in which the first instruction is configured to query the device to be charged 230 whether to operate in the first wireless charging mode. The communication control circuit 222 receives a reply instruction of the first instruction sent by the communication control circuit 236, in which the reply instruction of the first instruction is configured to indicate whether the device to be charged 230 agrees to operate in the first wireless charging mode. When the device to be charged 230 agrees to operate in the first wireless charging mode, the communication control circuit 222 controls the wireless charging device 220 to charge the device to be charged 230 in the first wireless charging mode.

Besides determining the wireless charging mode based on the negotiation, the communication control circuit 222 may select or switch the wireless charging mode according to some other factors. For example, the communication control circuit 222 may control the wireless charging device 220 to charge the battery 232 in the first wireless charging mode or in the second wireless charging mode according to the temperature of the battery 232.

For example, when the temperature is less than a preset threshold (for example, 5° C. or 10° C.) set in advance, the communication control circuit 222 may control the wireless charging device 220 to perform the normal charging in the second wireless charging mode; when the temperature is greater than or equal to the first threshold, the communication control circuit 222 may control the wireless charging device 220 to perform the fast charging in the first wireless charging mode. Further, when the temperature is greater than a high temperature threshold (for example, 50° C.), the communication control circuit 222 may control the wireless charging device 220 to stop charging.

It should be noted that, the wireless charging mode with adjustable transmitting power provided by embodiments of the present disclosure may be used to control one or more of charging stages of the battery 232. For example, the wireless charging mode with adjustable transmitting power provided by embodiments of the present disclosure may be mainly used to control the constant current charging stage of the battery 232. In other embodiments, the device to be charged 230 may keep the conversion circuit. When the battery is in the trickle charging stage and the constant voltage charging stage, the conventional wireless charging mode as illustrated in FIG. 1 is used for charging. In detail, when the battery 232 is in the trickle charging stage and the constant voltage charging stage, the conversion circuit in the device to be charged 230 may convert the output voltage and the output current of the wireless receiving circuit 231, to make them satisfy the charging requirement of the trickle charging stage and the constant voltage charging stage. Compared to the constant current charging stage, the charging power received by the battery 232 in the trickle charging stage and the constant voltage charging stage is lower, and efficiency loss and heat accumulation of the conversion circuit in the device to be charged 230 are acceptable. Detailed description will be given below with reference to FIG. 7.

Figure 7:
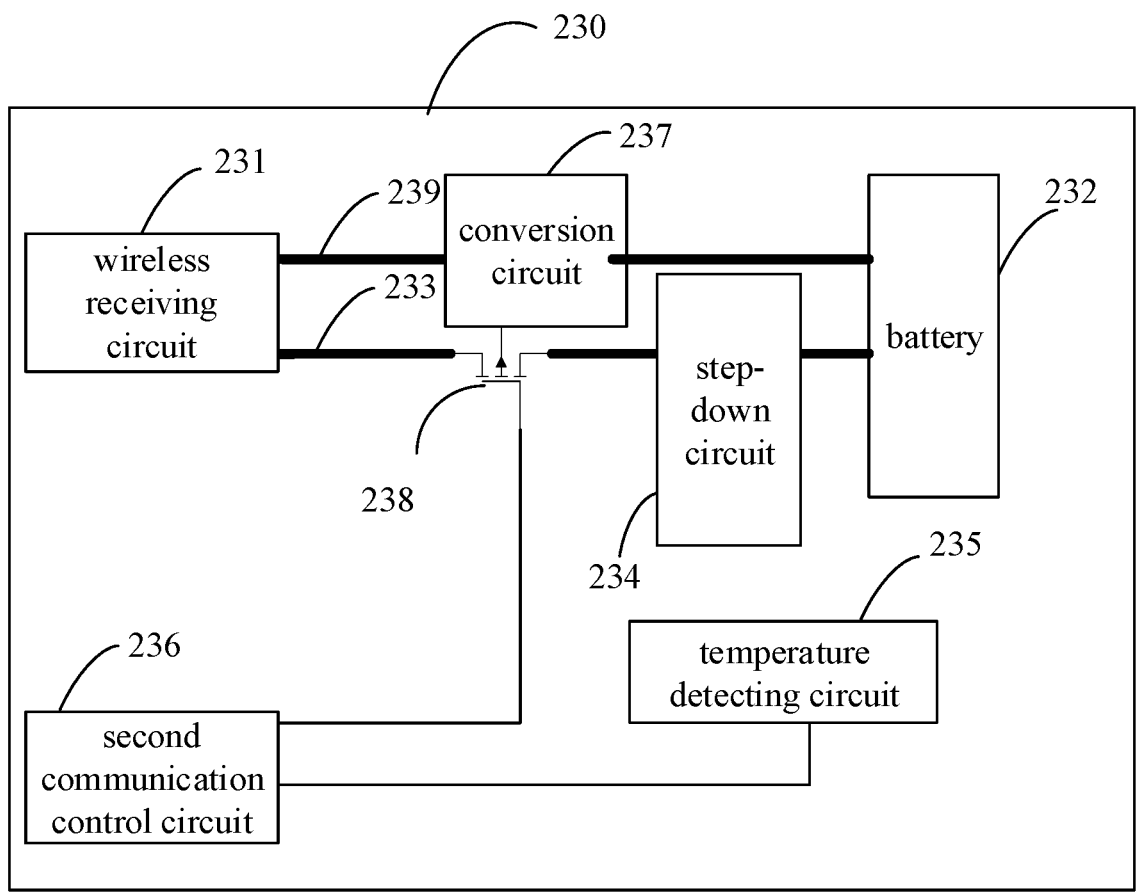
FIG. 7 is a schematic diagram of a device to be charged according to an embodiment of the present disclosure.

As illustrated in FIG. 7, the charging channel where the step-down circuit 234 is located may be referred to as a first charging channel 233. The device to be charged 230 may further include a second charging channel 239. The conversion circuit 237 may be arranged on the second charging channel 239. The conversion circuit 237 may be configured to receive the output voltage and the output current of the wireless receiving circuit 231, to perform constant voltage and/or constant current control on the output voltage and/or the output current of the wireless receiving circuit 231, such that the output voltage and/or the output current of the second charging channel 239 match the charging voltage and/or the charging current presently required by the battery 232, and the battery 232 is charged based on the output voltage and/or the output current of the second charging channel 239. The communication control circuit 236 may be further configured to control switch between the first charging channel 233 and the second charging channel 239. For example, as illustrated in FIG. 7, the first charging channel 233 may be provided with a switch 238, and the communication control circuit 236 may control the switch between the first charging channel 233 and the second charging channel 239 by controlling the switch 238 to switch on and off. As described above, in some embodiments, the wireless charging device 220 may include a first wireless charging mode and a second wireless charging mode, in which a charging speed of the wireless charging device 220 charging the device to be charged 230 in the first wireless charging mode is greater than a charging speed of the wireless charging device 220 charging the device to be charged 230 in the second wireless charging mode. When the wireless charging device 220 charges the battery in the device to be charged 230 in the first wireless charging mode, the device to be charged 220 may control the first charging channel 233 to work. When the wireless charging device 220 charges the battery in the device to be charged 230 in the second wireless charging mode, the device to be charged 230 may control the second charging channel 239 to work.

For example, when the battery 232 is in the trickle charging stage and/or the constant voltage charging stage, the communication control circuit 236 may control charging the battery 232 in the second charging channel 239, in which the constant voltage and constant current process of the battery may be controlled by the conversion circuit 237 (for example, a charging IC). When the battery 232 is in the constant current charging stage, the communication control circuit 236 may control charging the battery 232 in the first charging channel 233, in which the constant current control of the battery may be implemented based on adjusting the transmitting power by the wireless charging device. Keeping the conversion circuit 237 makes it to be compatible with the conventional wireless charging mode better.

It should be noted that, there are various ways for selecting between the first charging channel 233 and the second charging channel 239, which is not limited to select based on the charging stage where the battery 232 is presently is.

In some embodiments, the communication control circuit 236 may be configured to perform handshake communication with the communication control circuit 222, to control the first charging channel 233 to work when the handshake communication succeeds, and to control the second charging channel 239 to work when the handshake communication fails.

The handshake communication may refer to recognize the other's identity by any of the communication parties. When the handshake communication succeeds, it indicates that both the wireless charging device 220 and the device to be charged 230 support the wireless charging mode with adjustable transmitting power provided by embodiments of the present disclosure. When the handshake communication fails, it indicates that at least one of the wireless charging device 220 and the device to be charged 230 does not support the wireless charging mode with adjustable transmitting power provided by embodiments of the present disclosure. In a case that the handshake communication fails, the charging may be performed via the second charging channel 239 and the conventional wireless charging mode, such as the wireless charging mode based on QI standard may be adopted.

In other embodiments, the communication control circuit 236 may be further configured to control the switch between the first charging channel 233 and the second charging channel 239 according to the temperature of the battery 232.

For example, when the temperature is less than a preset threshold (for example, 5° C or 10° C.) set in advance, the communication control circuit 236 may control performing the normal wireless charging via the second charging channel 239; when the temperature is greater than or equal to the first threshold, the communication control circuit 236 may control performing the fast wireless charging via the first charging channel 233. Further, when the temperature is greater than a high temperature threshold (for example, 50° C.), the communication control circuit 236 may control stopping the wireless charging.

As noted above, the output current of the wireless receiving circuit 231 may be pulsating direct current, which may reduce the lithium precipitation of the battery 232, and improve the service life of the battery. When the wireless receiving circuit 231 outputs the pulsating direct current, the peak value or the mean value of the pulsating direct current may be detected by the detection circuit 234, such that the communication control circuit 236 may perform subsequent communication or control based on the peak value or mean value of the pulsating direct current.

In some embodiments, the wireless charging device 220 may further include a peripheral interface and a wireless data transmission circuit. The peripheral interface may be configured to be coupled with an electronic device having functions of data processing and transmission. The peripheral interface may be the charging interface described above, or may be other interfaces. The communication control circuit 222 may be further configured to perform the wireless charging on the device to be charged 230 according to the output power of the electronic device when the peripheral interface is coupled with the electronic device having functions of data processing and transmission. The wireless data transmission circuit may be configured to transmit data stored in the electronic device to the device to be charged 230 via a wireless link, or transmit data stored in the device to be charged 230 to the electronic device, during the process in which the wireless charging control unit performs the wireless charging on the device to be charged 230 according to the output power of the electronic device. The wireless data transmission circuit may be configured to transmit at least one of data in a USB protocol format, data in a DP (display port) protocol format, and data in a MHL (mobile high-definition link) format.

Hereinbefore, device embodiments of the present disclosure are described in detail with reference to FIGS. 2-7. Hereinafter, method embodiments of the present disclosure will be described in detail with reference to FIGS. 8-9. The method embodiments are corresponding to the device embodiments, and thus with respect to parts that are not described in detail, reference may be made to above device embodiments.

Figure 8:
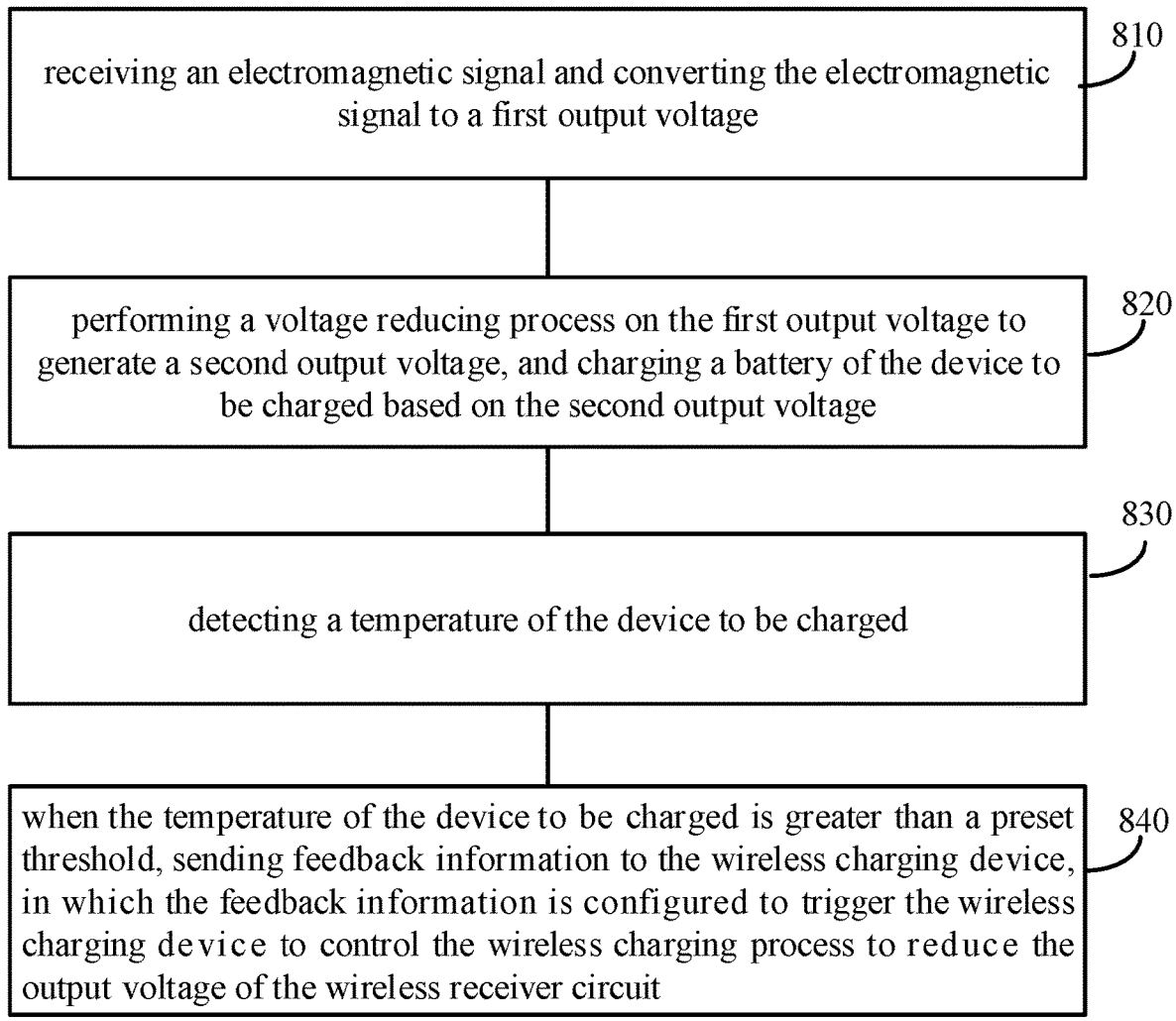
FIG. 8 is a schematic flowchart of a wireless charging method according to an embodiment of the present disclosure.

FIG. 8 is a schematic flowchart of a charging control method according to an embodiment of the present disclosure. The method may be applied to a device to be charged. The method in FIG. 8 includes following blocks 810-840.

At block 810, an electromagnetic signal is received and converted to a first output voltage.

At block 820, a step-down process is performed on the first output voltage to generate a second output voltage, and a battery of the device to be charged is charged based on the second output voltage.

At block 830, a temperature of the device to be charged is detected.

At block 840, when the temperature of the device to be charged is greater than a preset threshold, feedback information is sent to the wireless charging device, in which the feedback information is configured to trigger the wireless charging device to control the wireless charging process, to reduce the first output voltage.

In some embodiments, the method in FIG. 8 may further include: performing wireless communication with the wireless charging device, such that the wireless charging device controls the wireless charging process, to enable the second output voltage and/or an output current corresponding to the second output voltage to match a charging voltage and/or a charging current presently required by the battery.

Figure 9:
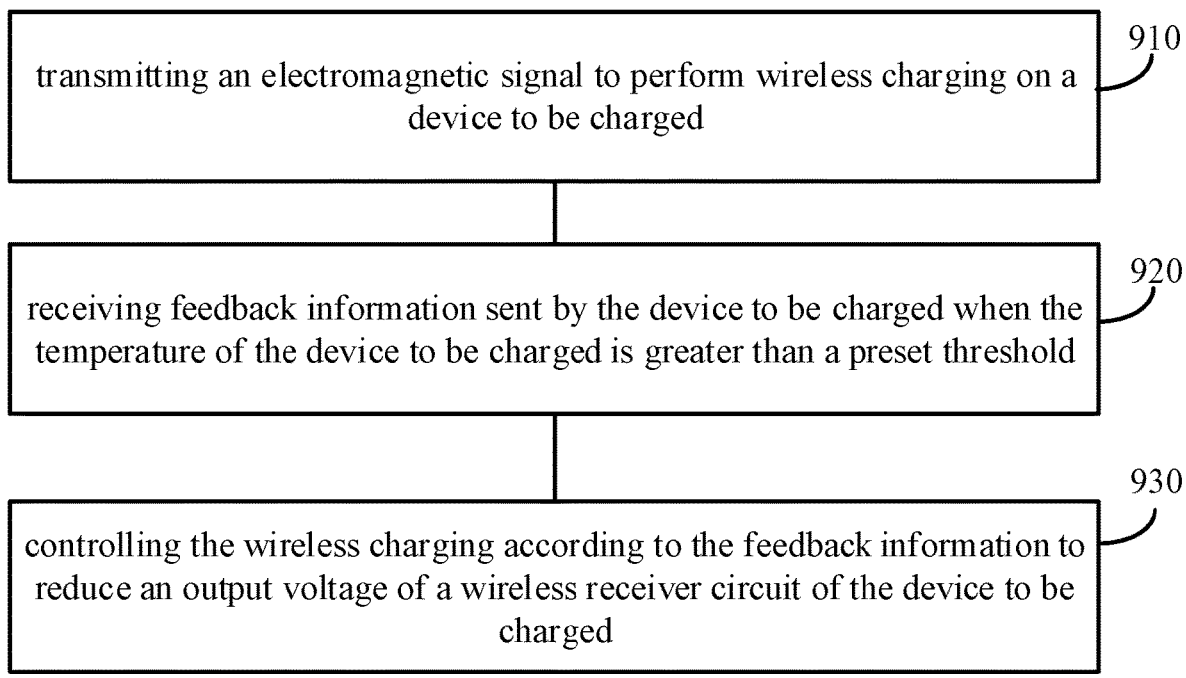
FIG. 9 is a schematic flowchart of a wireless charging method according to another embodiment of the present disclosure.

FIG. 9 is a schematic flowchart of a charging control method according to another embodiment of the present disclosure. The method may be applied to a wireless charging device.

The method in FIG. 9 includes blocks 910-930.

At block 910, an electromagnetic signal is transmitted to perform wireless charging on a device to be charged.

At block 920, feedback information is received, in which the feedback information is sent by the device to be charged when a temperature of the device to be charged is greater than a preset threshold.

At block 930, the wireless charging is controlled according to the feedback information, to reduce an output voltage of a wireless receiving circuit of the device to be charged.

In some embodiments, block 930 may include: reducing a duty ratio of transmitting the electromagnetic signal according to the feedback information, to reduce the output voltage of the wireless receiving circuit.

In some embodiments, block 930 may include: adjusting a transmitting frequency of transmitting the electromagnetic signal according to the feedback information, to reduce the output voltage of the wireless receiving circuit.

In some embodiments, the method may further include boosting an input voltage of the wireless charging device to obtain a boosted voltage, and generating the electromagnetic signal according to the boosted voltage, and block 930 may include reducing the boosted voltage, to reduce the output voltage of the wireless receiving circuit.

In some embodiments, the method in FIG. 9 may further include: performing wireless communication with the device to be charged, to adjust a transmitting power of transmitting the electromagnetic signal, such that the transmitting power of transmitting the electromagnetic signal matches a charging voltage and/or a charging current presently required by a battery of the device to be charged.

In above embodiments, it is possible to implement the embodiments fully or partially by software, hardware, firmware or any other combination. When implemented by software, it is possible to implement the embodiments fully or partially in a form of computer program products. The computer program product includes one or more computer instructions. When the computer program instructions are loaded and executed by the computer, procedures or functions according to embodiments of the present disclosure are fully or partially generated. The computer may be a general-purpose computer, a special-purpose computer, a computer network, or any other programmable device. The computer instructions may be stored in a computer readable storage medium, or may be transmitted from one computer readable storage medium to another computer readable storage medium. For example, the computer instructions may be transmitted from one website, computer, server or data center to another website, computer, server or data center in a wired manner (for example, via coaxial cables, fiber optics, or DSL (digital subscriber line)) or in a wireless manner (for example, via infrared, WiFi or microwave). The computer readable storage medium may be any available medium that are accessible by the computer, or a data storage device such as a server or a data center integrated with one or more available medium. The available medium may be magnetic medium (for example, floppy disk, hard disk and tape), optical medium (for example, DVD (digital video disc)), or semiconductor medium (for example, SSD (solid state disk)).

Those skilled in the art could be aware that, example units and algorithm steps described in combination with embodiments disclosed herein may be implemented by electronic hardware, or by a combination of computer software and electronic hardware. Whether these functions are executed by hardware or software is dependent on particular use and design constraints of the technical solutions. Professionals may adopt different methods for different particular use to implement described functions, which should not be regarded as going beyond the scope of the present disclosure.

In several embodiments provided by the present disclosure, it should be understood that, the disclosed system, device and method may be implemented in other ways. For example, the device embodiments described above are merely illustrative. For example, the units are merely divided according to logic functions, and can be divided in other ways in actual implementation. For example, a plurality of units or components may be combined or may be integrated into another system, or some features may be ignored or not executed. In addition, the mutual coupling or direct coupling or communication connection illustrated or discussed may be via some interfaces, or direct coupling or communication connection of devices or units may be in an electrical, mechanical, or other form.

The devices and apparatus mentioned in the present disclosure may each be a chip system or a device or an apparatus having a housing.

The units described as separate components may or may not be physically separated, and the components displayed as units may or may not be physical units, that is, may be located at one place, or may be distributed to multiple network units. Some or all of the units may be selected according to practical requirements to achieve the purpose of the solution of the embodiment.

Moreover, respective functional units in respective embodiments of the present disclosure may be integrated in one processing unit, or the respective units may be separate physical existence, or two or more units may be integrated in one unit.

Above description is merely specific implementation of the present disclosure. However, the protection scope of the present disclosure is not limited to this. Any change or substitute that is conceivable by those skilled in the art should be in the protection scope of the present disclosure. Thus, the protection scope of the present disclosure should be defined as the protection scope of claims.

What is claimed is:

1. A device to be charged, comprising:
   a wireless receiving circuit, configured to receive an electromagnetic signal transmitted by a wireless charging device and convert the electromagnetic signal to an output voltage of the wireless receiving circuit;
   a step-down circuit, configured to receive the output voltage of the wireless receiving circuit, perform step-down process on the output voltage of the wireless receiving circuit to obtain an output voltage of the step-down circuit, and charge a battery of the device to be charged based on the output voltage of the step-down circuit;
   a temperature detecting circuit, configured to detect a temperature of the device to be charged; and
   a communication control circuit, configured to send feedback information to the wireless charging device, when the temperature of the device to be charged is larger than a preset threshold, wherein the feedback information is configured to trigger the wireless charging device to control wireless charging process to reduce the output voltage of the wireless receiving circuit so as to reduce a difference between an input voltage and the output voltage of the step-down circuit and to increase a working efficiency of the step-down circuit.

2. The device to be charged according to claim 1, wherein the communication control circuit is further configured to perform wireless communication with the wireless charging device, such that the wireless charging device controls the wireless charging process to enable at least one of the output voltage or an output current of the step-down circuit to match at least one of a charging voltage or a charging current presently required by the battery.

3. The device to be charged according to claim 1, wherein the step-down circuit is a BUCK circuit.

4. The device to be charged according to claim 1, wherein the temperature detecting circuit comprises a temperature detecting resistor.

5. The device to be charged according to claim 4, wherein the temperature detecting resistor is integrated in the same chip with the step-down circuit.

6. A wireless charging device, comprising:
   a wireless transmitting circuit, configured to transmit an electromagnetic signal to perform wireless charging on a device to be charged; and a communication control circuit, configured to:
　　receive feedback information sent by the device to be charged when a temperature of the device to be charged is greater than a preset threshold; and
　　control the wireless charging according to the feedback information to reduce an output voltage of a wireless receiving circuit of the device to be charged, so as to reduce a difference between an input voltage and an output voltage of a step-down circuit of the device to be charged and to increase a working efficiency of the step-down circuit.

7. The wireless charging device according to claim 6, wherein the communication control circuit is configured to:
　　reduce a duty ratio of the wireless transmitting circuit according to the feedback information, to reduce the output voltage of the wireless receiving circuit.

8. The wireless charging device according to claim 6, wherein the communication control circuit is configured to:
　　adjust a transmitting frequency of the wireless transmitting circuit according to the feedback information, to reduce the output voltage of the wireless receiving circuit.

9. The wireless charging device according to claim 6, further comprises:
　　a voltage conversion circuit, configured to boost an input voltage of the wireless charging device to obtain an output voltage and an output current of the voltage conversion circuit;
　　wherein, the wireless transmitting circuit is configured to generate the electromagnetic signal according to the output voltage and the output current of the voltage conversion circuit; and
　　wherein, the communication control circuit is configured to:
　　　　reduce the output voltage of the voltage conversion circuit according to the feedback information, to reduce the output voltage of the wireless receiving circuit.

10. The wireless charging device according to claim 6, wherein the communication control circuit is further configured to perform wireless communication with the device to be charged to adjust a transmitting power of the wireless transmitting circuit, such that the transmitting power of the wireless transmitting circuit matches at least one of a charging voltage or a charging current presently required by a battery of the device to be charged.

11. The wireless charging device according to claim 9, wherein the voltage conversion circuit is a voltage boosting circuit.

12. The wireless charging device according to claim 11, wherein a boosting factor of the voltage boosting circuit is equal to a step-down factor of reducing the output voltage of the wireless receiving circuit.

13. A method for charging control, applied to a wireless charging device, and the method comprising:
　　transmitting an electromagnetic signal to perform wireless charging on a device to be charged;
　　receiving feedback information sent by the device to be charged when a temperature of the device to be charged is greater than a preset threshold; and
　　controlling the wireless charging according to the feedback information to reduce an output voltage of a wireless receiving circuit of the device to be charged, so as to reduce a difference between an input voltage and an output voltage of a step-down circuit of the device to be charged and to increase a working efficiency of the step-down circuit.

14. The method according to claim 13, wherein controlling the wireless charging according to the feedback information to reduce the output voltage of the wireless receiving circuit of the device to be charged, comprises:
　　reducing a duty ratio of transmitting the electromagnetic signal according to the feedback information, to reduce the output voltage of the wireless receiving circuit.

15. The method according to claim 13, wherein controlling the wireless charging according to the feedback information to reduce the output voltage of the wireless receiving circuit of the device to be charged, comprises:
　　adjusting a transmitting frequency of transmitting the electromagnetic signal according to the feedback information, to reduce the output voltage of the wireless receiving circuit.

16. The method according to claim 13, further comprising:
　　boosting an input voltage of the wireless charging device to obtain a boosted voltage; and
　　generating the electromagnetic signal according to the boosted voltage,
　　wherein, controlling the wireless charging according to the feedback information to reduce the output voltage of the wireless receiving circuit of the device to be charged, comprises:
　　reducing the boosted voltage according to the feedback information, to reduce the output voltage of the wireless receiving circuit.

17. The method according to claim 13, further comprising:
　　performing wireless communication with the device to be charged, to adjust a transmitting power of transmitting the electromagnetic signal, such that the transmitting power of transmitting the electromagnetic signal matches at least one of a charging voltage or a charging current presently required by a battery of the device to be charged.

* * * * *